US012690052B2

(12) United States Patent (10) Patent No.: US 12,690,052 B2

Park et al. (45) Date of Patent: Jul. 21, 2026

(54) METHOD AND DEVICE FOR OPERATING SL DRX ACTIVE TIME OF MODE 1 TERMINAL IN NR V2X

(71) Applicant: LG ELECTRONICS INC., Seoul (KR)

(72) Inventors: Giwon Park, Seoul (KR); Seoyoung Back, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 308 days.

(21) Appl. No.: 18/691,385

(22) PCT Filed: Sep. 13, 2022

(86) PCT No.: PCT/KR2022/013630

§ 371 (c)(1),
(2) Date: Mar. 12, 2024

(87) PCT Pub. No.: WO2023/038496

PCT Pub. Date: Mar. 16, 2023

(65) Prior Publication Data

US 2024/0389115 A1 Nov. 21, 2024

Related U.S. Application Data

(60) Provisional application No. 63/244,218, filed on Sep. 14, 2021, provisional application No. 63/243,709, filed on Sep. 13, 2021.

(30) Foreign Application Priority Data

Sep. 16, 2021 (KR) ........................ 10-2021-0123584

(51) Int. Cl.
*H04W 72/25* (2023.01)
*H04B 7/06* (2006.01)
(Continued)

(52) U.S. Cl.
CPC .......... *H04W 72/25* (2023.01); *H04B 7/0626* (2013.01); *H04L 1/1896* (2013.01); *H04W 28/0278* (2013.01); *H04W 76/28* (2018.02)

(58) Field of Classification Search
CPC .................................................... H04W 72/25
(Continued)

(56) References Cited

U.S. PATENT DOCUMENTS

2021/0227621 A1* 7/2021 Pan .................... H04W 72/0446

FOREIGN PATENT DOCUMENTS

| KR | 10-2021-0095065 | 7/2021 |
| WO | 2021-119474 | 6/2021 |
| WO | 2021-147959 | 7/2021 |

OTHER PUBLICATIONS

PCT International Application No. PCT/KR2022/013630, International Search Report dated Dec. 9, 2022, 3 pages.
(Continued)

*Primary Examiner* — Amir Shahnami

(74) *Attorney, Agent, or Firm* — LEE, HONG, DEGERMAN, KANG & WAIMEY

(57) ABSTRACT

A method of operating a first device (100) in a wireless communication system is proposed. The method may comprise the steps of: triggering buffer status reporting (BSR); reporting the BSR to a base station (300) on the basis of the triggering of the BSR, the BSR including information on a timer related to an active time of an SL DRX configuration; receiving, from the base station (300), information related to at least one SL resource that is allocated on the basis of the information on a timer related to an active time of an SL DRX configuration; and performing SL communication of a second device (200) on the basis of the at least one SL resource.

15 Claims, 15 Drawing Sheets

(51) Int. Cl.
*H04L 1/1867* (2023.01)
*H04W 28/02* (2009.01)
*H04W 76/28* (2018.01)

(58) Field of Classification Search
USPC ........................................................ 370/329
See application file for complete search history.

(56) References Cited

OTHER PUBLICATIONS

Nokia et al., "Discussion on alignment of mode 1 resource allocation and active time of SL Rx UE's DRX," R2-2108469, 3GPP TSG-RAN WG2 Meeting #114 Electronic, Aug. 2021, 5 pages.
Huawei et al., "Consideration on sidelink DRX for broadcast and groupcast," R2-2107155, 3GPP TSG-RAN WG2 Meeting #115-e, Online, Aug. 2021, 12 pages.

* cited by examiner

Timer length (820)

Remaining time of a timer (840)

Timer related to an SL DRX active time (800)

Transmission time point of information for a timer related to an SL DRX active time (830)

Timer starting point (810)

FIG. 10

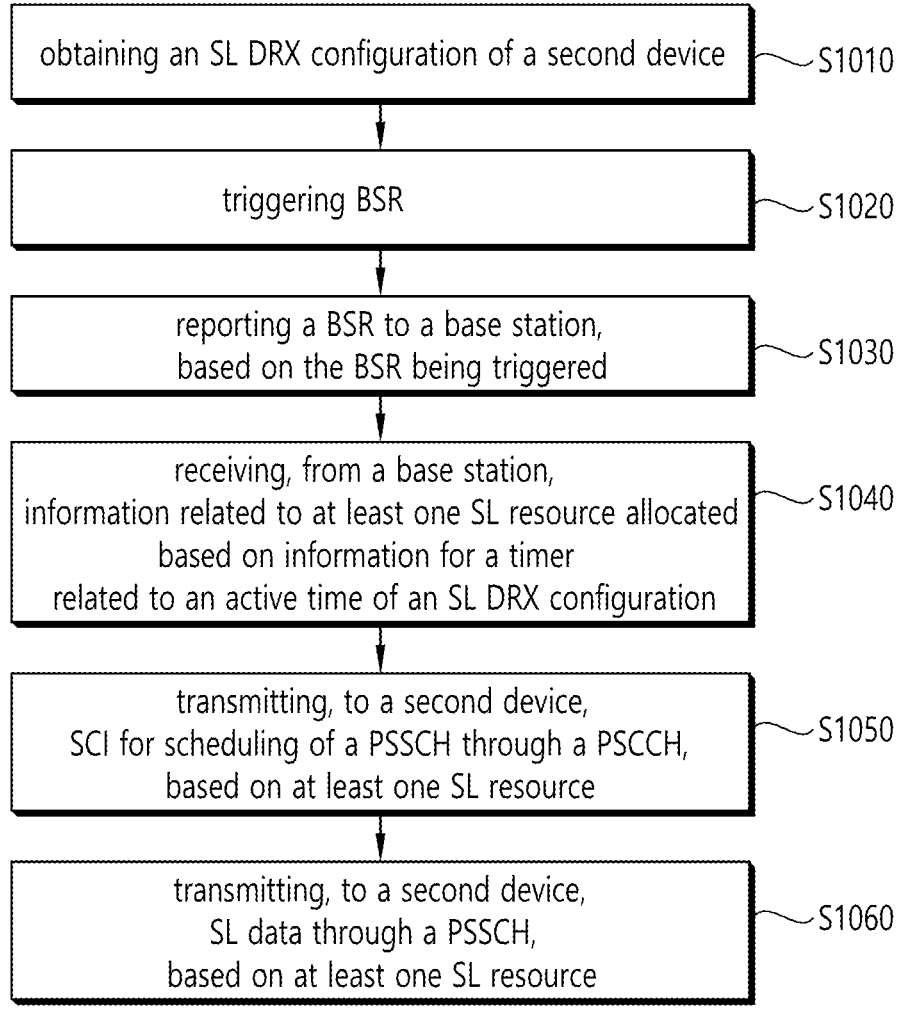

obtaining an SL DRX configuration of a second device — S1010 triggering BSR — S1020 reporting a BSR to a base station,
based on the BSR being triggered — S1030 receiving, from a base station,
information related to at least one SL resource allocated
based on information for a timer
related to an active time of an SL DRX configuration — S1040 transmitting, to a second device,
SCI for scheduling of a PSSCH through a PSCCH,
based on at least one SL resource — S1050 transmitting, to a second device,
SL data through a PSSCH,
based on at least one SL resource — S1060 obtaining an SL DRX configuration ~S1110 receiving, from a first device,
SCI for scheduling of a PSSCH through a PSCCH,
based on at least one SL resource ~S1120 receiving, from a first device, SL data through a PSSCH,
based on at least one SL resource ~S1130

1000(102/106, 202/206)

Device (100,200)

FIG. 17

METHOD AND DEVICE FOR OPERATING SL DRX ACTIVE TIME OF MODE 1 TERMINAL IN NR V2X

CROSS-REFERENCE TO RELATED APPLICATION(S)

This application is the National Stage filing under 35 U.S.C. 371 of International Application No. PCT/KR2022/013630, filed on Sep. 13, 2022, which claims the benefit of earlier filing date and right of priority to Korean Application No. 10-2021-0123584, filed on Sep. 16, 2021, and also claims the benefit of U.S. Provisional Application No. 63/243,709, filed on Sep. 13, 2021, and 63/244,218, filed on Sep. 14, 2021, the contents of which are all incorporated by reference herein in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication apparatuses require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

According to an embodiment of the present disclosure, a method for performing, by a first device, wireless communication may be proposed. For example, the method may comprise: obtaining a sidelink (SL) discontinuous reception (DRX) configuration of a second device; triggering buffer status reporting (BSR); reporting the BSR to a base station, based on the BSR being triggered, wherein the BSR may include information for a timer related to an active time of the SL DRX configuration; receiving, from the base station, information related to at least one SL resource allocated based on the information for the timer related to the active time of the SL DRX configuration; transmitting, to the second device, sidelink control information (SCI) for scheduling of a physical sidelink shared channel (PSSCH) through a physical sidelink control channel (PSCCH), based on the at least one SL resource; and transmitting, to the second device, SL data through the PSSCH, based on the at least one SL resource.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: obtain a sidelink (SL) discontinuous reception (DRX) configuration of a second device; trigger buffer status reporting (BSR); report the BSR to a base station, based on the BSR being triggered, wherein the BSR may include information for a timer related to an active time of the SL DRX configuration; receive, from the base station, information related to at least one SL resource allocated based on the information for the timer related to the active time of the SL DRX configuration; transmit, to the second device, sidelink control information (SCI) for scheduling of a physical sidelink shared channel (PSSCH) through a physical sidelink control channel (PSCCH), based on the at least one SL resource; and transmit, to the second device, SL data through the PSSCH, based on the at least one SL resource.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: obtain a sidelink (SL) discontinuous reception (DRX) configuration of a second UE; trigger buffer status reporting (BSR); report the BSR to a base station, based on the BSR being triggered, wherein the BSR may include information for a timer related to an active time of the SL DRX configuration; receive, from the base station, information related to at least one SL resource allocated based on the information for the timer related to the active time of the SL DRX configuration; transmit, to the second UE, sidelink control information (SCI) for scheduling of a physical sidelink shared channel (PSSCH) through a physical sidelink control channel (PSCCH), based on the at least one SL resource; and transmit, to the second UE, SL data through the PSSCH, based on the at least one SL resource.

According to an embodiment of the present disclosure, a non-transitory computer-readable storage medium storing instructions may be proposed. For example, when executed, the instructions may cause a first device to: obtain a sidelink (SL) discontinuous reception (DRX) configuration of a second device; trigger buffer status reporting (BSR); report the BSR to a base station, based on the BSR being triggered, wherein the BSR may include information for a timer related to an active time of the SL DRX configuration; receive, from the base station, information related to at least one SL resource allocated based on the information for the timer related to the active time of the SL DRX configuration; transmit, to the second device, sidelink control information (SCI) for scheduling of a physical sidelink shared channel (PSSCH) through a physical sidelink control channel (PSCCH), based on the at least one SL resource; and transmit, to the second device, SL data through the PSSCH, based on the at least one SL resource.

According to an embodiment of the present disclosure, a method for performing, by a second device, wireless communication may be proposed. For example, the method may comprise: obtaining a sidelink (SL) discontinuous reception (DRX) configuration; receiving, from a first device, sidelink control information (SCI) for scheduling of a physical sidelink shared channel (PSSCH) through a physical sidelink control channel (PSCCH), based on at least one SL resource; and receiving, from the first device, SL data through the PSSCH, based on the at least one SL resource, wherein the at least one SL resource may be allocated from a base station based on information for a timer related to an active time of the SL DRX configuration, and wherein the information for the timer related to the active time may be reported to the base station by being included in a buffer status reporting (BSR) based on triggering of the BSR.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: obtain a sidelink (SL) discontinuous reception (DRX) configuration; receive, from a first device, sidelink control information (SCI) for scheduling of a physical sidelink shared channel (PSSCH) through a physical sidelink control channel (PSCCH), based on at least one SL resource; and receive, from the first device, SL data through the PSSCH, based on the at least one SL resource, wherein the at least one SL resource may be allocated from a base station based on information for a timer related to an active time of the SL DRX configuration, and wherein the information for the timer related to the active time may be reported to the base station by being included in a buffer status reporting (BSR) based on triggering of the BSR.

A UE can efficiently perform sidelink communication.

BRIEF DESCRIPTION OF THE DRAWINGS

FIG. 2 shows a radio protocol architecture, based on an embodiment of the present disclosure.

FIG. 4 shows a structure of a slot of an NR frame, based on an embodiment of the present disclosure.

FIG. 10 shows a procedure in which a first device performs wireless communication, according to one embodiment of the present disclosure.

FIG. 17 shows a vehicle or an autonomous vehicle, based on an embodiment of the present disclosure.

DETAILED DESCRIPTION

Figure 1:
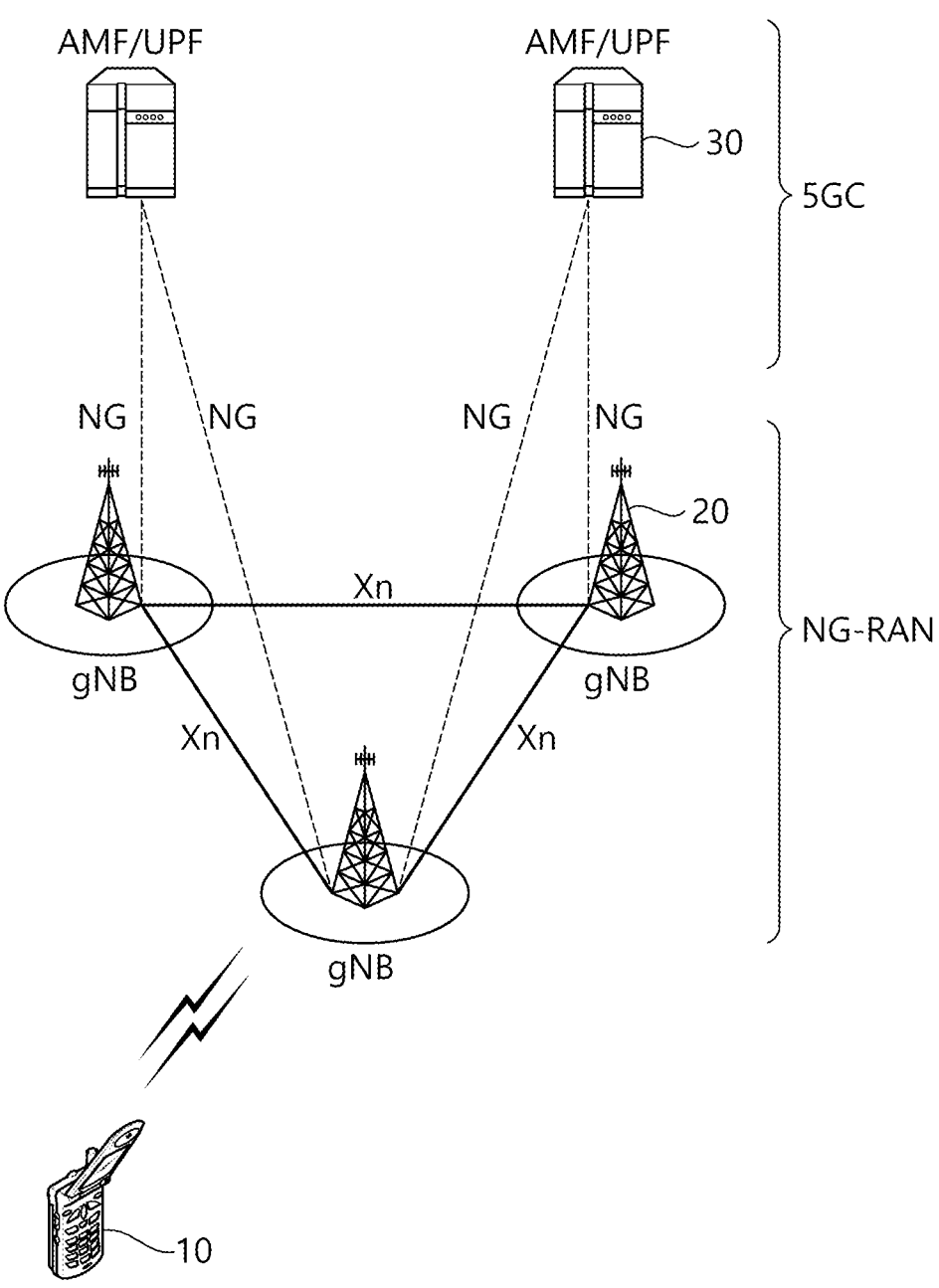
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC- FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHZ, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques used herein that are not specifically described, reference may be made to wireless communication standards documents published prior to the filing of this specification.

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
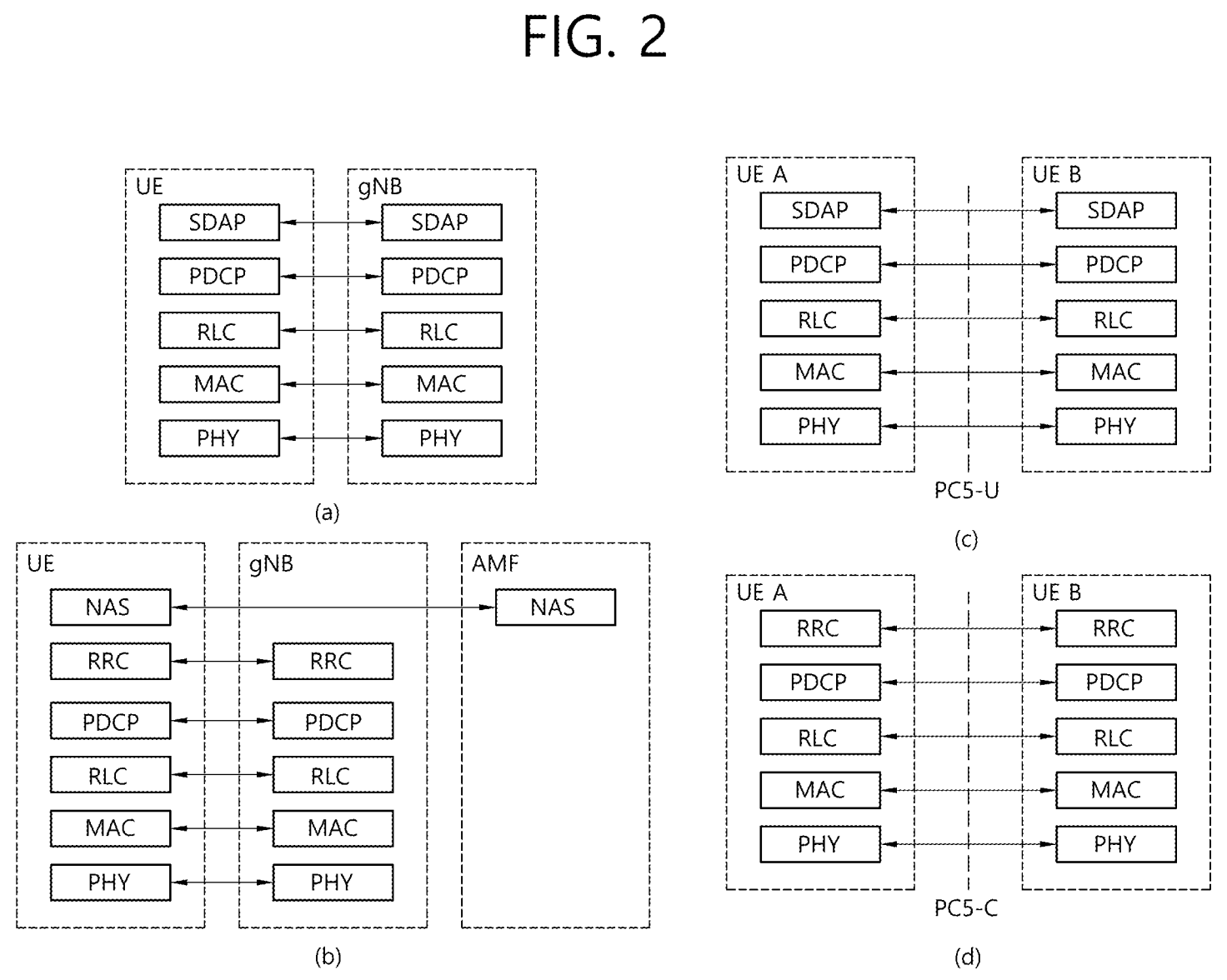

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an higher layer with an information transfer service through a physical channel. The physical layer is connected to a medium access control (MAC) layer which is an higher layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
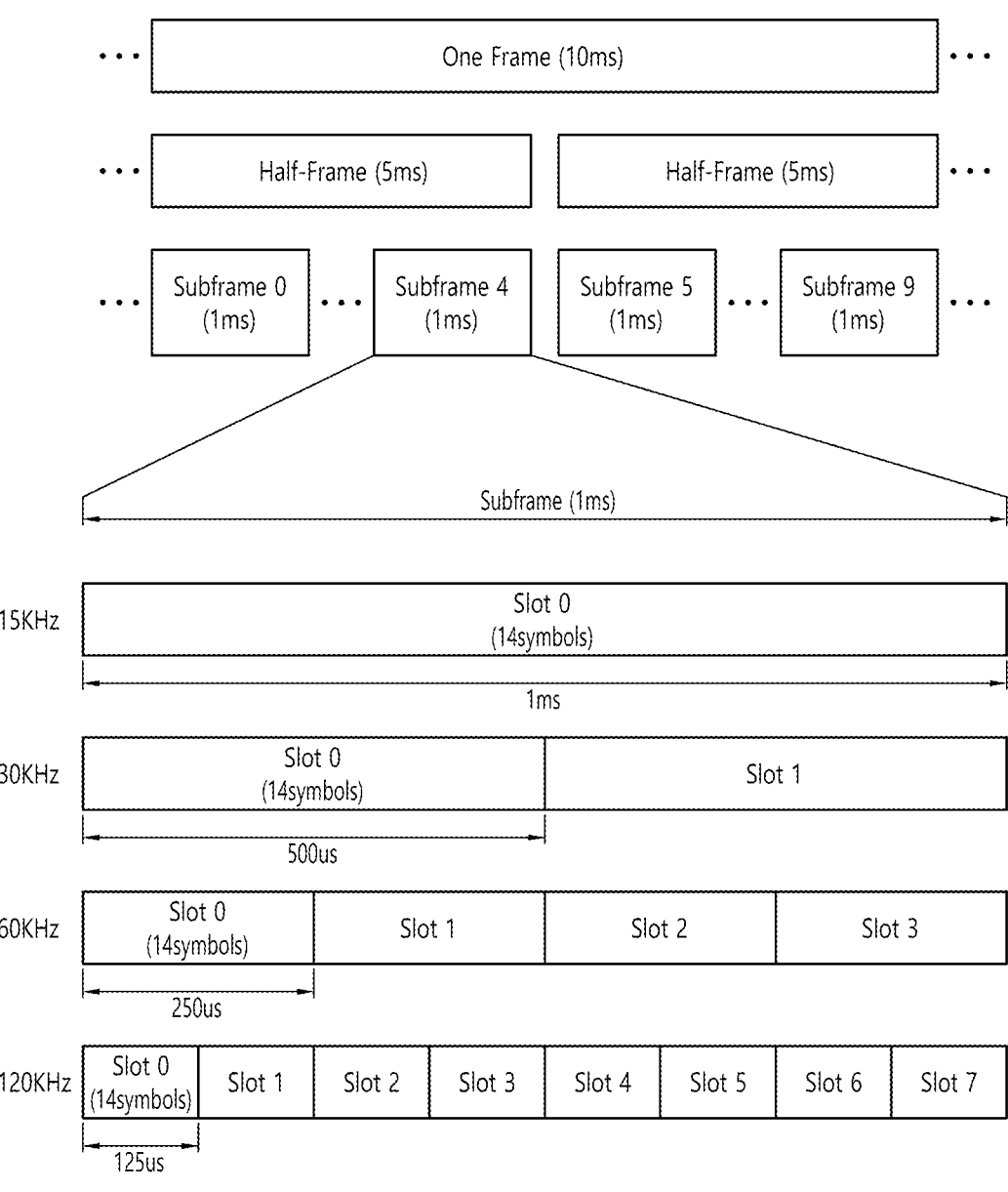
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM (A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM (A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 KHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHZ (or 5850, 5900, 5925 MHZ, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 4:
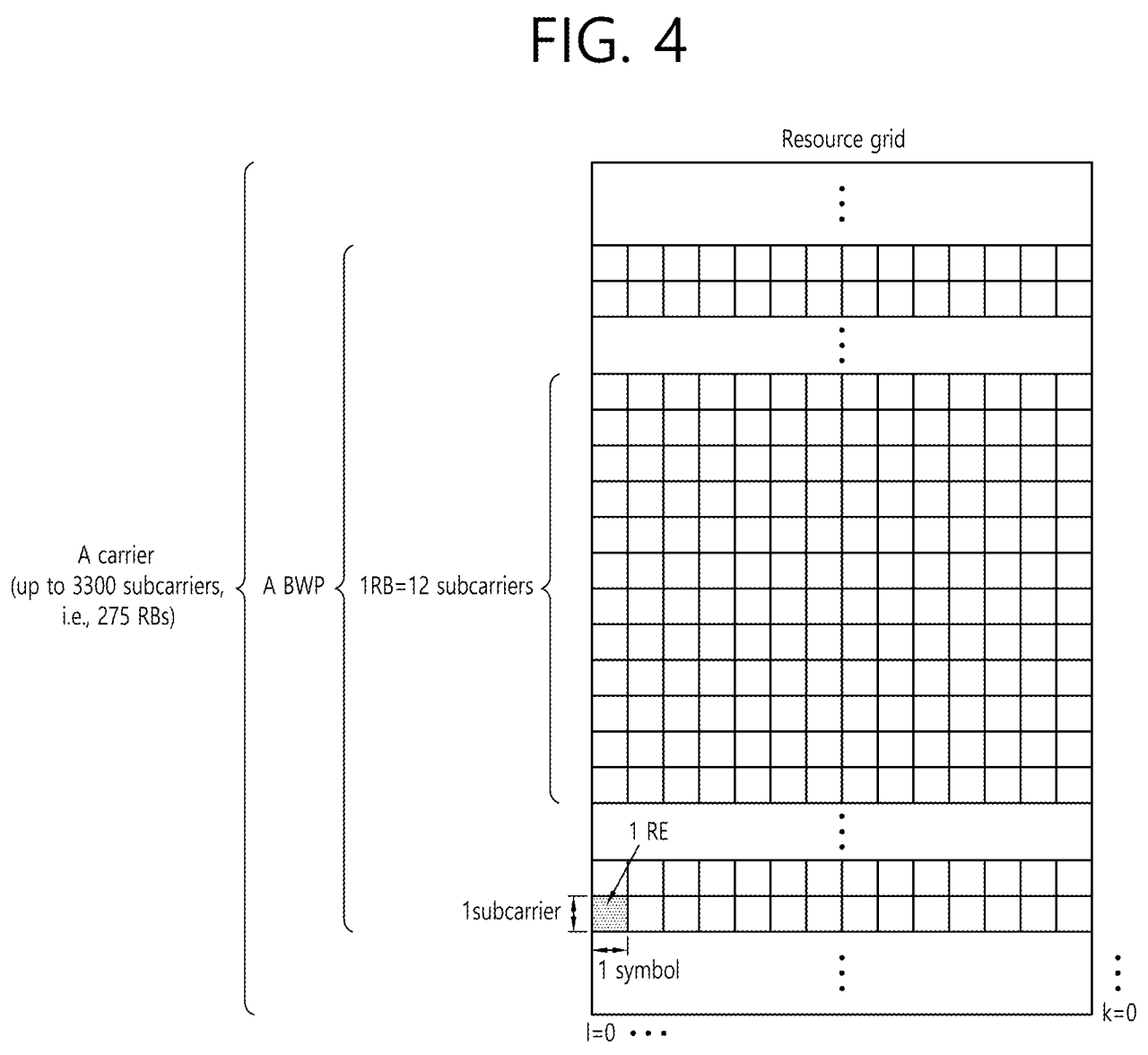

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P) RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-) configured in a carrier with respect to an out-of-coverage NR V2X UE and an RRC_IDLE UE. For the UE in the RRC_CONNECTED mode, at least one SL BWP may be activated in the carrier.

Figure 5:
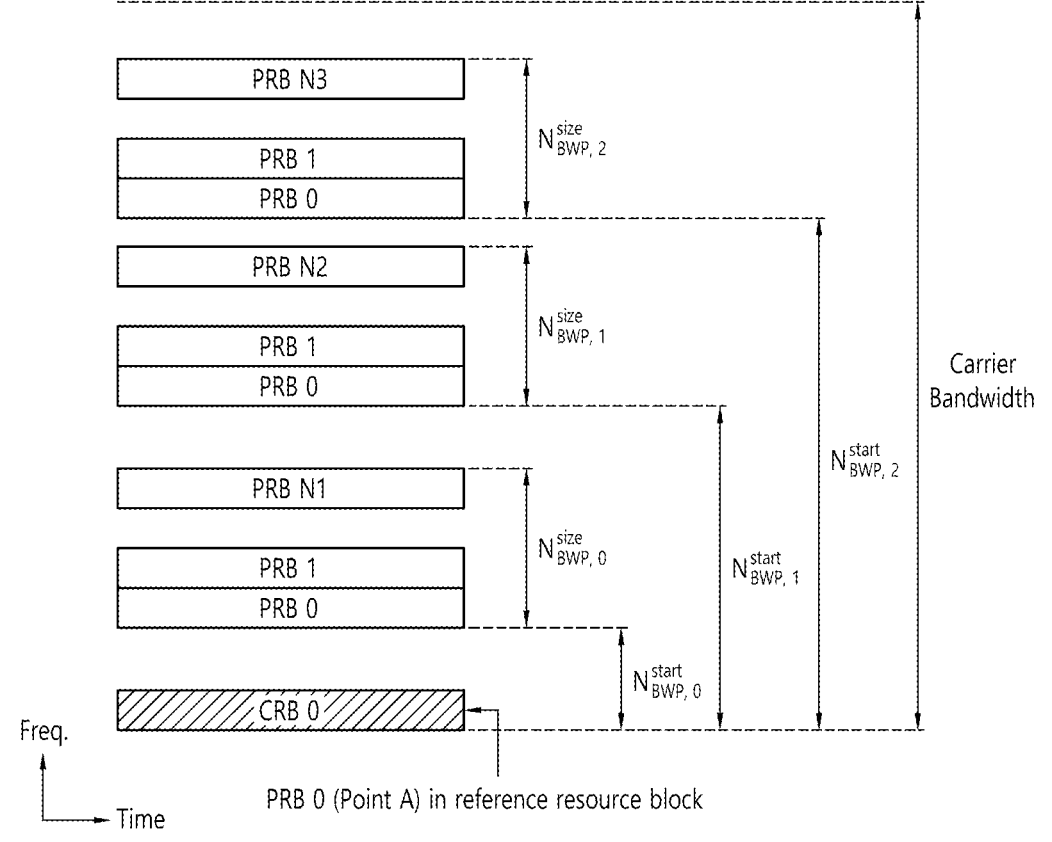
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-) configured sidelink (SL) BWP. For example, the S-SSB may have a bandwidth of 11 resource blocks (RBs). For example, the PSBCH may exist across 11 RBs. In addition, a frequency position of the S-SSB may be (pre-) configured. Accordingly, the UE does not have to perform hypothesis detection at frequency to discover the S-SSB in the carrier.

Figure 6:
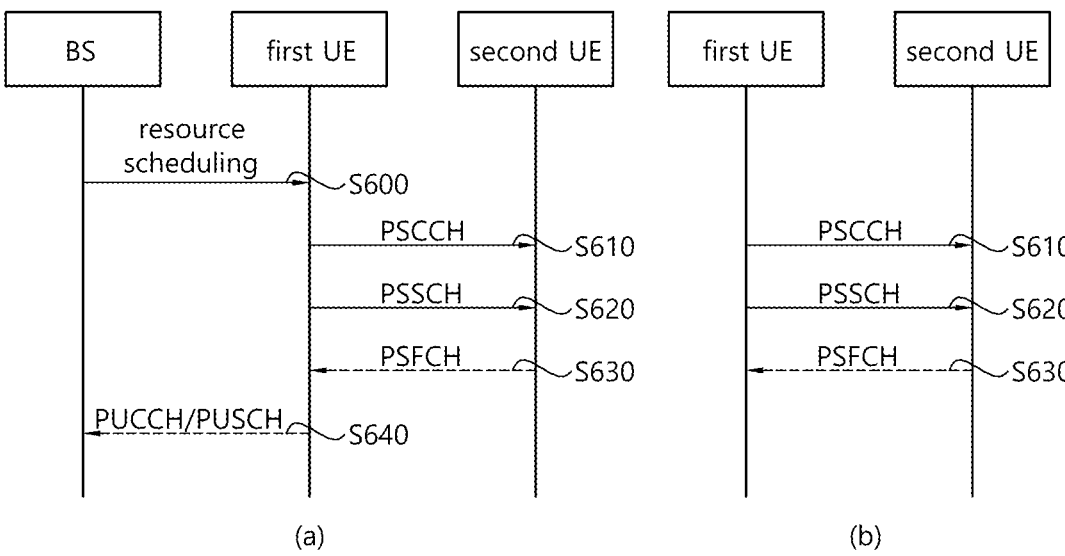
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or $1^{st}$-stage SCI) to a second UE based on the resource scheduling. In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Hereinafter, an example of DCI format 3_0 will be described.

DCI format 3_0 is used for scheduling of NR PSCCH and NR PSSCH in one cell.

The following information is transmitted by means of the DCI format 3_0 with CRC scrambled by SL-RNTI or SL-CS-RNTI Resource pool index—ceiling ($\log_2$ I) bits, where I is the number of resource pools for transmission configured by the higher layer parameter sl-TxPoolScheduling.

Time gap—3 bits determined by higher layer parameter sl-DCI-ToSL-Trans

HARQ process number—4 bits.

New data indicator—1 bit.

Lowest index of the subchannel allocation to the initial transmission-ceiling ($\log_2(N^{SL}_{subChannel})$) bits SCI format 1-A field: Frequency resource assignment, Time resource assignment PSFCH-to-HARQ feedback timing indicator-ceiling ($\log_2$ $N_{fb\_timing}$) bits, where $N_{fb\_timing}$ is the number of entries in the higher layer parameter sl-PSFCH-ToPUCCH, PUCCH resource indicator—3 bits Configuration index—0 bit if the UE is not configured to monitor DCI format 3_0 with CRC scrambled by SL-CS-RNTI; otherwise 3 bits. If the UE is configured to monitor DCI format 3_0 with CRC scrambled by SL-CS-RNTI, this field is reserved for DCI format 3_0 with CRC scrambled by SL-RNTI.

Counter sidelink assignment index—2 bits, 2 bits if the UE is configured with pdsch-HARQ-ACK-Codebook=dynamic. 2 bits if the UE is configured with pdsch-HARQ-ACK-Codebook=semi-static Padding bits, if required Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re) selection procedure. For example, the sensing may be performed in a unit of subchannel(s). For example, in step S610, a first UE which has selected resource(s) from a resource pool by itself may transmit a PSCCH (e.g., sidelink control information (SCI) or $1^{st}$-stage SCI) to a second UE by using the resource(s). In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a $1^{st}$ SCI, a first SCI, a $1^{st}$-stage SCI or a $1^{st}$-stage SCI format, and a SCI transmitted through a PSSCH may be referred to as a $2^{nd}$ SCI, a second SCI, a $2^{nd}$-stage SCI or a $2^{nd}$-stage SCI format. For example, the $1^{st}$-stage SCI format may include a SCI format 1-A, and the $2^{nd}$-stage SCI format may include a SCI format 2-A and/or a SCI format 2-B.

Hereinafter, an example of SCI format 1-A will be described.

SCI format 1-A is used for the scheduling of PSSCH and 2nd-stage-SCI on PSSCH.

The following information is transmitted by means of the SCI format 1-A:

Priority—3 bits

Frequency resource assignment—ceiling $(\log_2 (N^{SL}_{subChannel}(N^{SL}_{subChannel}+1)/2))$ bits when the value of the higher layer parameter sl-MaxNumPerReserve is configured to 2; otherwise ceiling $\log_2(N^{SL}_{subChannel} (N^{SL}_{subChannel}+1)(2N^{SL}_{subChannel}+1)/6)$ bits when the value of the higher layer parameter sl-MaxNumPerReserve is configured to 3

Time resource assignment—5 bits when the value of the higher layer parameter sl-MaxNumPerReserve is configured to 2; otherwise 9 bits when the value of the higher layer parameter sl-MaxNumPerReserve is configured to 3

Resource reservation period—ceiling $(\log_2 N_{rsv\_period})$ bits, where $N_{rsv\_period}$ is the number of entries in the higher layer parameter sl-ResourceReservePeriodList, if higher layer parameter sl-MultiReserveResource is configured; 0 bit otherwise DMRS pattern—ceiling $(\log_2 N_{pattern})$ bits, where $N_{pattern}$ is the number of DMRS patterns configured by higher layer parameter sl-PSSCH-DMRS-TimePatternList $2^{nd}$-stage SCI format—2 bits as defined in Table 5

Beta_offset indicator—2 bits as provided by higher layer parameter sl-BetaOffsets2ndSCI Number of DMRS port—1 bit as defined in Table 6

Modulation and coding scheme—5 bits

Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication-1 bit if higher layer parameter sl-PSFCH-Period=2 or 4; 0 bit otherwise Reserved-a number of bits as determined by higher layer parameter sl-NumReservedBits, with value set to zero.

TABLE 5

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 6

| Value of the Number of DMRS port field | Antenna ports |
|---|---|
| 0 | 1000 |
| 1 | 1000 and 1001 |

Hereinafter, an example of SCI format 2-A will be described.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits

New data indicator—1 bit

Redundancy version—2 bits

Source ID—8 bits

Destination ID—16 bits

HARQ feedback enabled/disabled indicator—1 bit

Cast type indicator—2 bits as defined in Table 7

CSI request—1 bit

TABLE 7

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described.

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits

New data indicator—1 bit

Redundancy version—2 bits

Source ID—8 bits

Destination ID—16 bits

HARQ feedback enabled/disabled indicator—1 bit

Zone ID—12 bits

Communication range requirement—4 bits determined by higher layer parameter sl-ZoneConfigMCR-Index Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Figure 7:
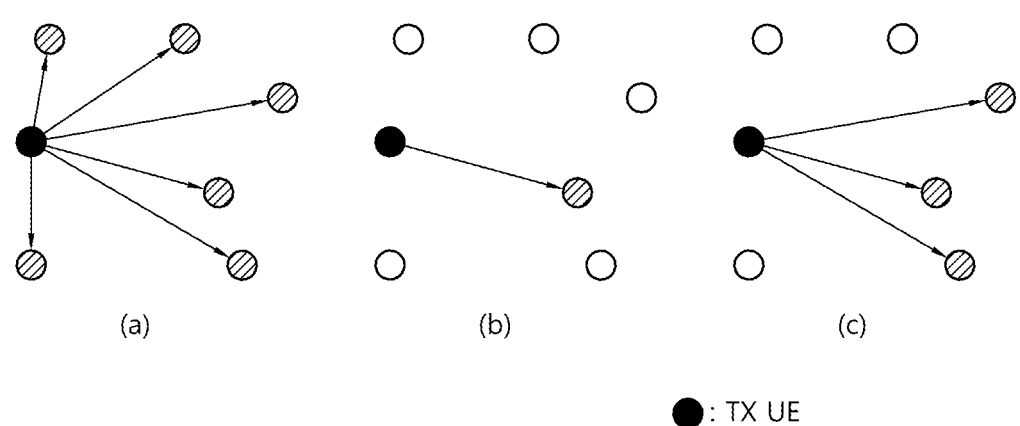
FIG. 7 shows three cast types, based on an embodiment of the present disclosure.

FIG. 7 shows three cast types, based on an embodiment of the present disclosure. The embodiment of FIG. 7 may be combined with various embodiments of the present disclosure. Specifically, FIG. 7(*a*) shows a broadcast type of SL communication, FIG. 7(*b*) shows a unicast type of SL communication, and FIG. 7(*c*) shows a groupcast type of SL communication. In the case of unicast type SL communication, a UE may perform one-to-one communication with other UEs. In the case of groupcast type SL communication, a UE may perform SL communication with one or more UEs in a group to which it belongs. In various embodiments of the present disclosure, SL groupcast communication may be replaced by SL multicast communication, SL one-to-many communication, and the like.

In this specification, the wording "configuration or definition" may be interpreted as being configured (in advance) by a base station or network (e.g., through predefined signaling (e.g., SIB signaling, MAC signaling, RRC signaling). For example, "A may be configured" may include "a base station or network (pre) configures/defines or informs the UE of A". Alternatively, the wording "configuration or definition" may be interpreted as being configured or defined in advance by the system. For example, "A may be configured" may include "A is configured/defined in advance by the system".

Referring to the standard documentation, some procedures and technical specifications related to this disclosure are as follows.

TABLE 8

| 3GPP TS 38.321 V16.2.1 |
| --- |

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].

NOTE 1: If Sidelink resource allocation mode 1 is configured by RRC, a DRX
        functionality is not configured.

RRC controls DRX operation by configuring the following parameters:
- drx-onDurationTimer: the duration at the beginning of a DRX cycle;
- drx-SlotOffset: the delay before starting the drx-onDurationTimer;
- drx-InactivityTimer: the duration after the PDCCH occasion in which a PDCCH indicates a new UL or DL transmission for the MAC entity;
- drx-RetransmissionTimerDL (per DL HARQ process except for the broadcast process): the maximum duration until a DL retransmission is received;
- drx-RetransmissionTimerUL (per UL HARQ process): the maximum duration until a grant for UL retransmission is received;
- drx-LongCycleStartOffset: the Long DRX cycle and drx-StartOffset which defines the subframe where the Long and Short DRX cycle starts;
- drx-ShortCycle (optional): the Short DRX cycle;
- drx-ShortCycleTimer (optional): the duration the UE shall follow the Short DRX cycle;
- drx-HARQ-RTT-TimerDL (per DL HARQ process except for the broadcast process): the minimum duration before a DL assignment for HARQ retransmission is expected by the MAC entity;
- drx-HARQ-RTT-TimerUL (per UL HARQ process): the minimum duration before a UL HARQ retransmission grant is expected by the MAC entity;
- ps-Wakeup (optional): the configuration to start associated drx-onDurationTimer in case DCP is monitored but not detected;
- ps-TransmitOtherPeriodicCSI (optional): the configuration to report periodic CSI that is not L1-RSRP on PUCCH during the time duration indicated by drx-onDurationTimer in case DCP is configured but associated drx-onDurationTimer is not started;
- ps-TransmitPeriodicL1-RSRP (optional): the configuration to transmit periodic CSI that is L1-RSRP on PUCCH during the time duration indicated by drx-onDurationTimer in case DCP is configured but associated drx-onDurationTimer is not started.

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

TABLE 9

When a DRX cycle is configured, the Active Time for Serving Cells in a DRX group includes the time while:
- drx-onDurationTimer or drx-InactivityTimer configured for the DRX group is running; or
- drx-RetransmissionTimerDL or drx-RetransmissionTimerUL is running on any Serving Cell in the DRX group; or
- ra-ContentionResolutionTimer (as described in clause 5.1.5) or msgB-Response Window (as described in clause 5.1.4a) is running; or
- a Scheduling Request is sent on PUCCH and is pending (as described in clause 5.4.4); or
- a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a).

When DRX is configured, the MAC entity shall:
    1>if a MAC PDU is received in a configured downlink assignment:
        2>start the drx-HARQ-RTT-TimerDL for the corresponding HARQ process in the first symbol after the end of the corresponding transmission carrying the DL TABLE 9-continued

```
      HARQ feedback;
    2>stop the drx-RetransmissionTimerDL for the corresponding HARQ process.
  1>if a MAC PDU is transmitted in a configured uplink grant and LBT failure
    indication is not received from lower layers:
    2>start the drx-HARQ-RTT-TimerUL for the corresponding HARQ process in the
      first symbol after the end of the first repetition of the corresponding PUSCH
      transmission;
    2>stop the drx-RetransmissionTimerUL for the corresponding HARQ process.
  1>if a drx-HARQ-RTT-TimerDL expires:
    2>if the data of the corresponding HARQ process was not successfully decoded:
      3>start the drx-RetransmissionTimerDL for the corresponding HARQ process
        in the first symbol after the expiry of drx-HARQ-RTT-TimerDL.
  1>if a drx-HARQ-RTT-TimerUL expires:
    2>start the drx-RetransmissionTimerUL for the corresponding HARQ process in
      the first symbol after the expiry of drx-HARQ-RTT-TimerUL.
  1>if a DRX Command MAC CE or a Long DRX Command MAC CE is received:
    2>stop drx-onDurationTimer for each DRX group;
    2>stop drx-InactivityTimer for each DRX group.
  1>if drx-InactivityTimer for a DRX group expires:
    2>if the Short DRX cycle is configured:
      3>start or restart drx-ShortCycleTimer for this DRX group in the first symbol
        after the expiry of drx-InactivityTimer;
      3>use the Short DRX cycle for this DRX group.
    2>else:
      3>use the Long DRX cycle for this DRX group.
  1>if a DRX Command MAC CE is received:
    2>if the Short DRX cycle is configured:
      3>start or restart drx-ShortCycleTimer for each DRX group in the first symbol
        after the end of DRX Command MAC CE reception;
      3>use the Short DRX cycle for each DRX group.
    2>else:
      3>use the Long DRX cycle for each DRX group.
```

TABLE 10

```
1>if drx-ShortCycleTimer for a DRX group expires:
  2>use the Long DRX cycle for this DRX group.
1>if a Long DRX Command MAC CE is received:
  2>stop drx-ShortCycleTimer for each DRX group;
  2>use the Long DRX cycle for each DRX group.
1>if the Short DRX cycle is used for a DRX group, and [(SFN × 10) + subframe
  number] modulo (drx-ShortCycle) = (drx-StartOffset) modulo (drx-ShortCycle):
  2>start drx-onDurationTimer for this DRX group after drx-SlotOffset from the
    beginning of the subframe.
1>if the Long DRX cycle is used for a DRX group, and [(SFN × 10) + subframe
  number] modulo (drx-LongCycle) = drx-StartOffset:
  2>if DCP monitoring is configured for the active DL BWP as specified in TS
    38.213 [6], clause 10.3:
    3>if DCP indication associated with the current DRX cycle received from
      lower layer indicated to start drx-onDurationTimer, as specified in TS
      38.213 [6]; or
    3>if all DCP occasion(s) in time domain, as specified in TS 38.213 [6],
      associated with the current DRX cycle occurred in Active Time considering
      grants/assignments/DRX Command MAC CE/Long DRX Command MAC
      CE received and Scheduling Request sent until 4 ms prior to start of the last
      DCP occasion, or within BWP switching interruption length, or during a
      measurement gap, or when the MAC entity monitors for a PDCCH
      transmission on the search space indicated by recoverySearchSpaceId of the
      SpCell identified by the C-RNTI while the ra-ResponseWindow is running
      (as specified in clause 5.1.4); or
    3>if ps-Wakeup is configured with value true and DCP indication associated
      with the current DRX cycle has not been received from lower layers:
      4>start drx-onDurationTimer after drx-SlotOffset from the beginning of the
        subframe.
  2>else:
    3>start drx-onDurationTimer for this DRX group after drx-SlotOffset from the
      beginning of the subframe.
NOTE 2:  In case of unaligned SFN across carriers in a cell group, the SFN of the
      SpCell is used to calculate the DRX duration.
1>if a DRX group is in Active Time:
  2>monitor the PDCCH on the Serving Cells in this DRX group as specified in TS
    38.213 [6];
  2>if the PDCCH indicates a DL transmission:
    3>start the drx-HARQ-RTT-TimerDL for the corresponding HARQ process in
      the first symbol after the end of the corresponding transmission carrying the
      DL HARQ feedback;
```

TABLE 10-continued

NOTE 3: When HARQ feedback is postponed by PDSCH-to-HARQ_feedback
timing indicating a non-numerical k1 value, as specified in TS 38.213 [6],
the corresponding transmission opportunity to send the DL HARQ feedback
is indicated in a later PDCCH requesting the HARQ-ACK feedback.
3>stop the drx-RetransmissionTimerDL for the corresponding HARQ process.
3>if the PDSCH-to-HARQ feedback timing indicate a non-numerical k1 value
as specified in TS 38.213 [6]:
4>start the drx-RetransmissionTimerDL in the first symbol after the PDSCH
transmission for the corresponding HARQ process.

TABLE 11

2>if the PDCCH indicates a UL transmission:
    3>start the drx-HARQ-RTT-TimerUL for the corresponding HARQ process in
        the first symbol after the end of the first repetition of the corresponding
        PUSCH transmission;
    3>stop the drx-RetransmissionTimerUL for the corresponding HARQ process.
2>if the PDCCH indicates a new transmission (DL or UL) on a Serving Cell in
    this DRX group:
    3>start or restart drx-InactivityTimer for this DRX group in the first symbol
        after the end of the PDCCH reception.
2>if a HARQ process receives downlink feedback information and
    acknowledgement is indicated:
    3>stop the drx-RetransmissionTimerUL for the corresponding HARQ process.
1>if DCP monitoring is configured for the active DL BWP as specified in TS 38.213
    [6], clause 10.3; and
1>if the current symbol n occurs within drx-onDurationTimer duration; and
1>if drx-onDurationTimer associated with the current DRX cycle is not started as
    specified in this clause:
    2>if the MAC entity would not be in Active Time considering
        grants/assignments/DRX Command MAC CE/Long DRX Command MAC CE
        received and Scheduling Request sent until 4 ms prior to symbol n when
        evaluating all DRX Active Time conditions as specified in this clause:
        3>not transmit periodic SRS and semi-persistent SRS defined in TS 38.214 [7];
        3>not report semi-persistent CSI configured on PUSCH;
        3>if ps-TransmitPeriodicL1-RSRP is not configured with value true:
            4>not report periodic CSI that is L1-RSRP on PUCCH.
        3>if ps-TransmitOtherPeriodicCSI is not configured with value true:
            4>not report periodic CSI that is not L1-RSRP on PUCCH.
1>else:
    2>in current symbol n, if a DRX group would not be in Active Time considering
        grants/assignments scheduled on Serving Cell(s) in this DRX group and DRX
        Command MAC CE/Long DRX Command MAC CE received and Scheduling
        Request sent until 4 ms prior to symbol n when evaluating all DRX Active
        Time conditions as specified in this clause:
        3>not transmit periodic SRS and semi-persistent SRS defined in TS 38.214 [7]
            in this DRX group;
        3>not report CSI on PUCCH and semi-persistent CSI configured on PUSCH in
            this DRX group.
    2>if CSI masking (csi-Mask) is setup by upper layers:
        3>in current symbol n, if drx-onDurationTimer of a DRX group would not be
            running considering grants/assignments scheduled on Serving Cell(s) in this
            DRX group and DRX Command MAC CE/Long DRX Command MAC CE
            received until 4 ms prior to symbol n when evaluating all DRX Active Time
            conditions as specified in this clause; and
            4>not report CSI on PUCCH in this DRX group.
NOTE 4: If a UE multiplexes a CSI configured on PUCCH with other
    overlapping UCI(s) according to the procedure specified in TS 38.213 [6]
    clause 9.2.5 and this CSI multiplexed with other UCI(s) would be reported
    on a PUCCH resource outside DRX Active Time of the DRX group in which
    this PUCCH is configured, it is up to UE implementation whether to report
    this CSI multiplexed with other UCI(s).
Regardless of whether the MAC entity is monitoring PDCCH or not on the Serving Cells
in a DRX group, the MAC entity transmits HARQ feedback, aperiodic CSI on PUSCH,
and aperiodic SRS defined in TS 38.214 [7] on the Serving Cells in the DRX group
when such is expected.
The MAC entity needs not to monitor the PDCCH if it is not a complete PDCCH
occasion (e.g. the Active Time starts or ends in the middle of a PDCCH occasion).

60

On the other hand, NR V2X in Release 16 did not support power saving operation of UEs, and NR V2X in Release 17 will support power saving operation of UEs (i.e., power saving UEs).

For example, in order for a UE's power saving operation (e.g. Sidelink (SL) DRX operation) to be performed, the SL DRX Configuration to be used by a power saving UE (P-UE) may need to be defined. Furthermore, operations of a transmitting UE and a receiving UE performed in on-duration and off-duration may need to be defined. For example, the SL DRX configuration may include SL DRX Cycle, SL DRX On-duration, SL DRX Off-duration, timers to support SL DRX operation (e.g., SL DRX Inactivity timer, SL DRX HARQ RTT timer, SL DRX Retransmission timer), etc. For example, the on-duration may be an interval during which a UE may perform sidelink reception/transmission. For example, the off-duration may be an interval during which a UE operates in sleep mode.

And, for example, an SL DRX operation (e.g., SL DRX timer operation) of a receiving UE may be performed differently according to a resource selection/reservation operation (e.g., operation based on Mode 1 resource allocation scheme, operation based on Mode 2 resource allocation scheme) of a transmitting UE.

In the embodiment(s) of the present disclosure, a method of SL DRX operation of a receiving UE (or transmitting UE) based on a resource (re) selection/reservation operation of a transmitting UE is proposed. In the following description, "when, if, in case of" may be replaced by "based on". For example, the resource (re) selection/reservation operation may include a mode 1 resource allocation based operation and/or a mode 2 resource allocation based operation.

According to the prior art, if SL DRX operation is supported for UEs operating based on sidelink mode 1 resource allocation, the following issues may arise.

For example, since a base station does not know the status (e.g., timer length, remaining timer length, etc.) of an SL DRX timer operated by a transmitting UE and a receiving UE, based on the transmission of a PSCCH/PSSCH from the transmitting UE, it cannot be guaranteed whether the resource that the base station allocates based on a Mode 1 resource request from the transmitting UE is included within an active time or an inactive time of the receiving UE.

Furthermore, since a base station does not know which of the resources allocated by the base station the transmitting UE performed the transmission based on, it cannot be guaranteed that the additional resources (e.g., retransmission resources, or initial transmission resources) allocated by the base station are resources that fall within the DRX active time of the destination UE (i.e., receiving UE) of the transmitting UE, even if the base station considers the SL DRX configuration of the UE (e.g., on-duration timer, inactivity timer, retransmission timer). That is, for example, the additional resource allocated may be a resource that falls within the SL DRX inactive time (sleep mode operation interval) of the destination receiving UE. For example, the SL DRX active time may include an active mode operation interval.

For example, the PSCCH/PSSCH may include at least one of initial transmission, retransmission, or SCI including CSI reporting trigger indication. For example, a receiving UE may trigger the SL DRX timer based on the reception of the PSCCH/PSSCH transmitted by a transmitting UE. For example, the SL DRX timer may include an SL DRX inactivity timer, an SL DRX retransmission timer, and an SL DRX CSI reporting timer. Wherein, the SL DRX CSI reporting timer may include a timer to monitor the CSI reporting MAC CE from the perspective of a transmitting UE/a timer that causes it to operate as an active time to transmit the CSI reporting MAC CE from the perspective of a receiving UE.

Therefore, the following operation of a UE is proposed in this disclosure.

According to one embodiment of the present disclosure, a method where a UE reports to a base station information for the status (timer length, remaining timer length, etc.) of an SL DRX timer that a transmitting UE and/or a receiving UE is currently causing (or will cause in the future to be started by the UE based on resource information included in the SCI of the transmitting UE) to operate when the following conditions are met. Alternatively, for example, a method where a UE reports to a base station information for the status of any SL DRX timers that a transmitting UE and/or a receiving UE is currently causing to operate when the following conditions are met.

For example, the SL DRX timer status information may be reported to a base station via at least one of MAC CE, RRC message (SL UE information, UE assistance information), BSR MAC CE, PUCCH, or PUSCH. For example, the SL DRX timer, which is a timer that causes a UE to operate with an active time, may include an SL DRX inactivity timer, an SL DRX retransmission timer, and an SL DRX CSI reporting timer. For example, the SL DRX CSI reporting timer may include a timer for monitoring the CSI reporting MAC CE from the perspective of a transmitting UE, and a timer that causes it to operate as an active time for transmitting the CSI reporting MAC CE from the perspective of a receiving UE.

1. SL DRX timer Status Information

For example, the SL DRX timer status information according to one embodiment of the present disclosure may include information (1.1. through 1.4.) below.

1.1. active time length information of an SL DRX inactivity timer

For example, the active time length information of an SL DRX inactivity timer, according to one embodiment of the present disclosure, may include information (1.1.1. through 1.1.11.) below.

1.1.1. the configured timer length 1.1.2. the remaining timer length 1.1.3. timer starting time point (e.g., it may include time/frequency information.)

1.1.4. information related to a receiving UE causing a timer to operate (or, which will operate a timer) (e.g., L2 destination ID). Or, information related to a transmitting UE and a receiving UE (e.g., a pair of a source L2 ID and a destination ID)

1.1.5. QoS profile information linked to a timer (e.g., PQI). Or, information for a service (e.g., L2 destination ID)

1.1.6. a HARQ process ID and a sidelink (SL) process ID linked to a timer 1.1.7. unicast link information linked to a timer (e.g., it may include the direction of a pair of an L2 source ID and an L2 destination ID and/or a PC5 link identifier)

1.1.8. resource allocation mode indication (mode 1, or, mode 2)

1.1.9. SL HARQ feedback mode indication (HARQ feedback enabled, or, disabled)

1.1.10. indication for whether a PUCCH is configured (PUCCH is configured, or, is not configured)

1.1.11. indication for whether a PSFCH is configured in a resource pool (PSFCH configured, or, not configured)

For example, active time length information of an SL DRX retransmission timer, according to an embodiment, may include information (1.2.1. through 1.2.11.) below.

1.2.1. the configured timer length 1.2.2. the remaining timer length 1.2.3. timer starting time point (e.g., it may include time/frequency information.)

1.2.4. information related to a receiving UE causing a timer to operate (or, which will operate a timer) (e.g., L2 destination ID). Or, information related to a transmitting UE and a receiving UE (e.g., a pair of a source L2 ID and a destination ID)

1.2.5. QoS profile information linked to a timer (e.g., PQI). Or, information for a service (e.g., L2 destination ID)

1.2.6. a HARQ process ID and an SL process ID linked to a timer 1.2.7. unicast link information linked to a timer (e.g., it may include the direction of a pair of an L2 source ID and an L2 destination ID and/or a PC5 link identifier)

1.2.8. resource allocation mode indication (mode 1, or, mode 2)

1.2.9. SL HARQ feedback mode indication (HARQ feedback enabled, or, disabled)

1.2.10. indication for whether a PUCCH is configured (PUCCH is configured, or, is not configured)

1.2.11. indication for whether a PSFCH is configured in a resource pool (PSFCH configured, or, not configured)

For example, active time length information of an SL DRX CSI reporting timer, according to an embodiment of the present disclosure, may include information (1.3.1. through 1.3.11.) below.

1.3.1. the configured timer length 1.3.2. the remaining timer length 1.3.3. timer starting time point (e.g., it may include time/frequency information.)

1.3.4. information related to a receiving UE causing a timer to operate (or, which will operate a timer) (e.g., L2 destination ID). Or, information related to a transmitting UE and a receiving UE (e.g., a pair of a source L2 ID and a destination ID)

1.3.5. QoS profile information linked to a timer (e.g., PQI). Or, information for a service (e.g., L2 destination ID)

1.3.6. a HARQ process ID and an SL process ID linked to a timer 1.3.7. unicast link information linked to a timer (e.g., it may include the direction of a pair of an L2 source ID and an L2 destination ID and/or a PC5 link identifier)

1.3.8. resource allocation mode indication (mode 1, or, mode 2)

1.3.9. SL HARQ feedback mode indication (HARQ feedback enabled, or, disabled)

1.3.10. indication for whether a PUCCH is configured (PUCCH is configured, or, is not configured)

1.3.11. indication for whether a PSFCH is configured in a resource pool (PSFCH configured, or, not configured)

For example, active time length information of an SL DRX active timer, according to an embodiment of the present disclosure, may include information (1.4.1 through 1.4.11) below. For example, the SL DRX active time may be a timer that causes a UE to operate as an active time.

1.4.1. the configured timer length 1.4.2. the remaining timer length 1.4.3. timer starting time point (e.g., it may include time/frequency information.)

1.4.4. information related to a receiving UE causing a timer to operate (or, which will operate a timer) (e.g., L2 destination ID). Or, information related to a transmitting UE and a receiving UE (e.g., a pair of a source L2 ID and a destination ID)

1.4.5. QoS profile information linked to a timer (e.g., PQI). Or, information for a service (e.g., L2 destination ID)

1.4.6. a HARQ process ID and an SL process ID linked to a timer 1.4.7. unicast link information linked to a timer (e.g., it may include the direction of a pair of an L2 source ID and an L2 destination ID and/or a PC5 link identifier)

1.4.8. resource allocation mode indication (mode 1, or, mode 2)

1.4.9. SL HARQ feedback mode indication (HARQ feedback enabled, or, disabled)

1.4.10. indication for whether a PUCCH is configured (PUCCH is configured, or, is not configured)

1.4.11. indication for whether a PSFCH is configured in a resource pool (PSFCH configured, or, not configured)

2. The Condition where an SL DRX Timer Status Report is Transmitted

For example, an SL DRX timer status report, according to an embodiment, may be transmitted when conditions (2.1. through 2.7) below are met.

2.1. when a BSR transmission is triggered or transmitted (for mode 1 resource allocation request for a sidelink data transmission)

2.2. when an SR transmission is triggered or transmitted (for mode 1 resource allocation request for a sidelink data transmission)

2.3. the report may be transmitted whenever a defined periodic timer expires. For example, the timer may be restarted each time the periodic timer expires.

Figure 8:
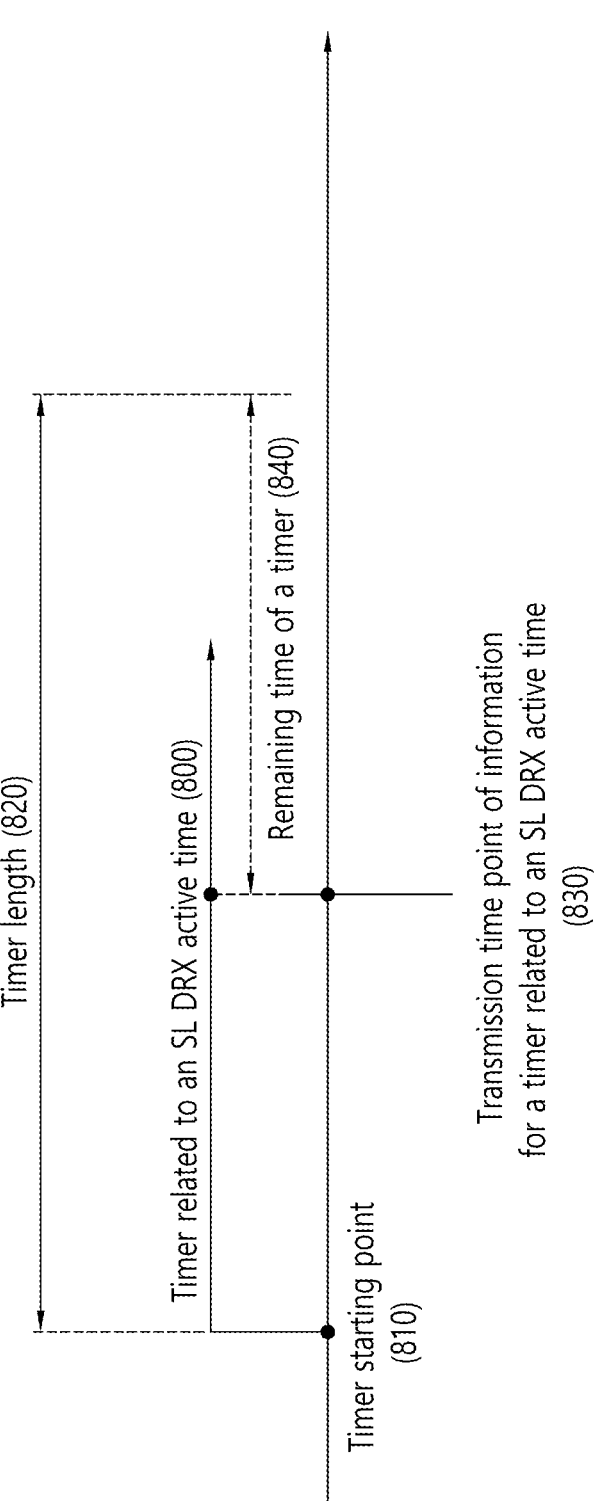
FIG. 8 shows an embodiment related to information for a timer related to an SL DRX active time that is transmitted by a transmitting UE to a base station, according to one embodiment of the present disclosure.

2.4. when a CSI reporting is triggered. Or, SCI that triggers a CSI reporting is transmitted 2.5. when a sidelink new TB is transmitted or received 2.6. when a sidelink retransmission TB is transmitted or received 2.7. when a PUCCH (SL HARQ feedback) is transmitted FIG. 8 shows an embodiment related to information for a timer related to an SL DRX active time that is transmitted by a transmitting UE to a base station, according to one embodiment of the present disclosure. The embodiment of FIG. 8 may be combined with various embodiments of the present disclosure.

Referring to FIG. 8, 800 may be a timer related to the SL DRX active time. For example, 800 may be a timer that a receiving UE is operating for SL DRX operation. For example, 800 may represent a timer that a transmitting UE has aligned with a timer that a receiving UE is operating for SL DRX operation. Here, the timer related to the SL DRX active time may include at least one of an SL DRX on-duration timer, an SL DRX retransmission timer, an SL DRX SCI reporting timer, or an SL DRX inactive timer.

For example, 810 may be a starting point of the SL DRX timer 800. For example, 820 may be a configured timer length of the SL DRX timer 800. For example, the SL DRX timer 800 may be scheduled to operate for the configured timer length. For example, 840 may indicate the remaining time of the SL DRX timer, calculated based on the timer's starting point 810 and the timer length 820.

For example, 830 may represent a time point at which a transmitting UE transmits information for a timer related to an SL DRX active time to a base station, i.e., the remaining time of the timer 840 may represent the remaining time of the timer at the transmission time point 830. For example, at the transmission point 830, a transmitting UE may transmit "information for a timer related to an SL DRX active time" according to various embodiments of the present disclosure when a condition is met according to various embodiments of the present disclosure. For example, the information for a timer related to an SL DRX active time may include at least one of the following: a type of timer 800 related to the SL DRX active time, a start point 810 of the timer, a configured length 820 of the timer, or the remaining time 840 on the basis of the time of transmission of the timer.

Figure 9:
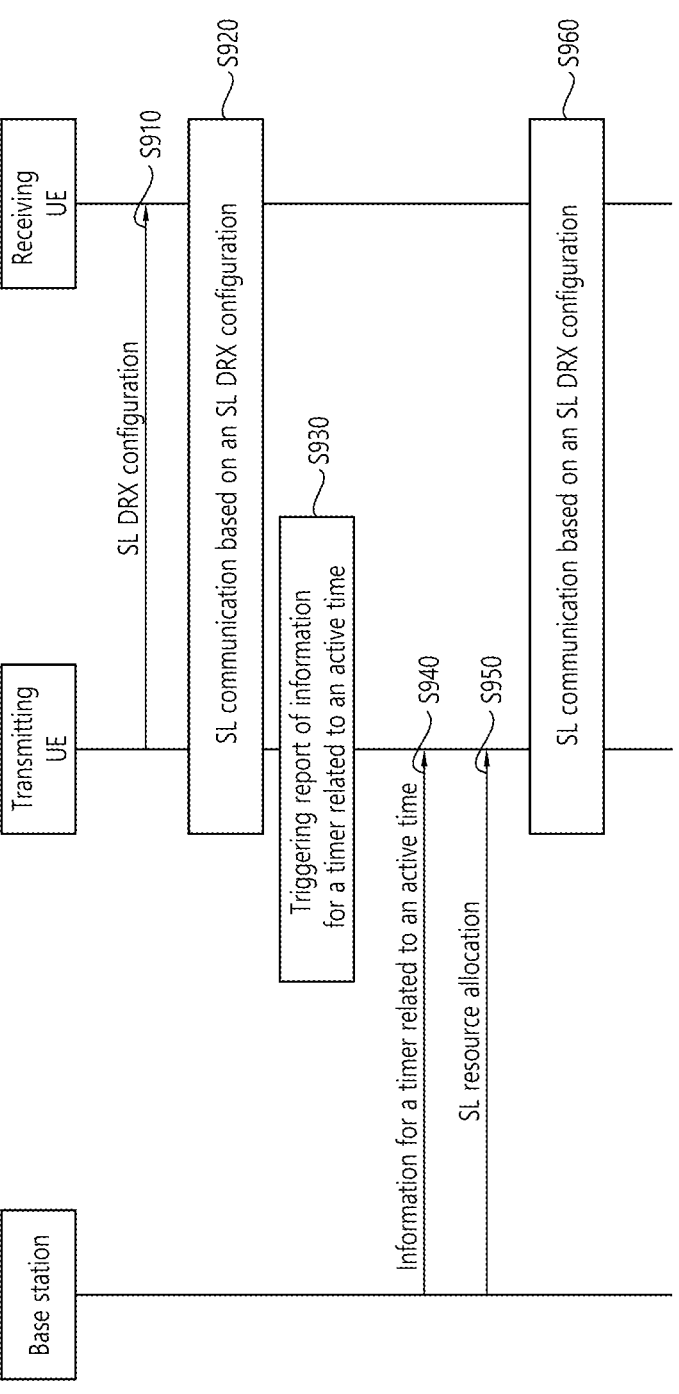
FIG. 9 shows a procedure for a transmitting UE to perform SL communication based on information for a timer related to an active time, according to one embodiment of the present disclosure.

FIG. 9 shows a procedure for a transmitting UE to perform SL communication based on information for a timer related to an active time, according to one embodiment of the present disclosure. The embodiment of FIG. 9 may be combined with various embodiments of the present disclosure.

Referring to FIG. 9, in step S910, a transmitting UE may transmit an SL DRX configuration to a receiving UE. For example, the SL DRX configuration may include at least one of information for an SL DRX on-duration timer, information for an SL DRX cycle, or information for an SL DRX inactivity timer. In step S920, the transmitting UE and the receiving UE may perform SL communication based on the SL DRX configuration. For example, the receiving UE may perform monitoring for a PSCCH and/or PSSCH based on an active time of the SL DRX configuration. Here, the receiving UE may operate a timer related to an SL DRX active time, which is included in the SL DRX configuration.

In step S930, the transmitting UE may trigger reporting of information for a timer related to the SL DRX active time that the receiving UE is operating. For example, the information for a timer related to the SL DRX active time may include information according to various embodiments of the present disclosure. For example, the information may include at least one of a type of timer related to the SL DRX active time, a starting point of the timer, a configured length of the timer, or a remaining time on the basis of the time of transmission of the timer. For example, reporting of information for a timer related to the SL DRX active time may be triggered when a condition is met, according to various embodiments of the present disclosure. For example, the condition may include triggering of a BSR transmission, triggering of an SR transmission, or triggering of CSI reporting.

In step S940, the transmitting UE may transmit to a base station, information for a timer related to the active time. In step S950, the base station may allocate an SL resource for use by the transmitting UE based on the information for a timer related to the active time. Here, the base station may allocate the SL resources based on the information for a timer related to the active time, i.e., the base station may allocate the SL resources to be included in the SL DRX active time of the receiving UE based on the information for a timer related to the active time.

In step S960, the transmitting UE and the receiving UE may perform SL communication, based on the SL resources that the base station allocated to the transmitting UE in step S950. For example, the SL resources used here are allocated based on the SL DRX active time of the receiving UE, so that the SL communication can be performed smoothly within the SL DRX active time.

According to one embodiment of the present disclosure, when a UE transmits an SL DRX command MAC CE to a peer UE, by causing the UE to report this to a base station, it is possible to cause the base station not to allocate resources within the inactive time (sleep mode) of the peer receiving UE when allocating resources (for initial transmission, or retransmission) to the transmitting UE that transmitted the report. For example, upon receiving the SL DRX command MAC CE, the UE may stop or terminate the SL DRX timer it is operating and operate in sleep mode. For example, a message that a UE reports to a base station after transmitting an SL DRX MAC CE may be a message indicating that the SL DRX command MAC CE was transmitted to a peer receiving UE, and the message may be transmitted via at least one of a MAC CE, an RRC message (e.g., SL UE information, UE assistance information), PUCCH, PUSCH, or BSR.

According to one embodiment of the present disclosure, when a UE transmits an SL DRX command MAC CE to another UE, the UE may report this to a base station so that resources allocated to the transmitting UE are released. For example, upon receiving the SL DRX command MAC CE, the UE may stop or terminate the SL DRX timer it is operating, and may operate in sleep mode. For example, a message that a UE reports to a base station after transmitting an SL DRX MAC CE may be a message indicating that it has transmitted an SL DRX command MAC CE to the other receiving UE, and the message may include L2 ID information of the UE transmitting or receiving the SL DRX command MAC CE, respectively. Further, the message may be transmitted via at least one of a MAC CE, an RRC message (e.g., SL UE information, UE assistance information), a PUCCH (SL HARQ ACK instruction), a PUSCH (SL HARQ ACK indication), or a BSR. For example, the resource allocated and released to a transmitting UE may be a resource allocated for a message to be transmitted to a UE receiving an SL DRX command MAC CE, and may also include at least one of an initial transmission resource, a retransmission resource, or a Configured Grant (CG) resource.

According to one embodiment of the present disclosure, when a UE transmits a SL DRX command MAC CE to another UE, the UE may stop (or terminate) the running Uu DRX RetransmissiontimerSL and stop the PDCCH monitoring operation for sidelink mode 1 retransmission resource allocation. Further, the UE may indicate that the transmitting UE will stop (or terminate) the Uu DRX RetransmissiontimerSL by causing the UE to report this to a base station. For example, upon receipt of the SL DRX command MAC CE, the UE may stop or terminate the SL DRX timer it is operating, and may operate in sleep mode. For example, a message that a UE reports to a base station after transmitting an SL DRX MAC CE may be a message indicating that it has transmitted an SL DRX command MAC CE to the other receiving UE, and the message may include L2 ID information of the UE transmitting or receiving the SL DRX command MAC CE, respectively. Further, the message may be transmitted via at least one of a MAC CE, an RRC message (e.g., SL UE information, UE assistance information), a PUCCH (SL HARQ ACK indication), a PUSCH (SL HARQ ACK indication), or a BSR.

According to one embodiment of the present disclosure, a method is proposed that if a sidelink transmission resource that a transmitting UE has been allocated by a base station is not included within an SL DRX active time interval of a receiving UE, the transmitting UE may be caused to transmit, to the base station, a MAC CE (e.g., a BSR MAC CE, or, a new MAC CE) or a PUCCH (SL HARQ feedback NACK) as proposed in the present disclosure to allow the transmitting UE to be reallocated a transmission resource that is included within the SL DRX active time interval of the receiving UE. For example, the SL DRX active time may include the time during which at least one of the on-duration timer, inactivity timer, retransmission timer, or any other SL DRX timer that causes it to operate in active mode is running.

For example, a MAC CE proposed in this disclosure may include the following information.

1. Information for the allocated transmission resources. For example, information for the transmission resource that is not included within an active time of a receiving UE. For example, information for the time/frequency of the transmission resource.

2. DRX active time information of a receiving UE that is currently operating. For example, information for an on-duration timer, inactivity timer, retransmission timer, and other SL DRX timers that cause it to operate in active mode. For example, the DRX active time information may include information for the timer start time, end time, etc. For example, the DRX active time information may include time/frequency information (resource allocation units) that is matched to a timer interval.

3. Initial Transmission (or, Retransmission) Resource Request Indication

3. SL HARQ feedback NACK indication. For example, indicating a HARQ NACK means a request for sidelink retransmission resource.

4. If a UE performed an initial transmission (or retransmission), the resource information used for the initial transmission (or retransmission). For example, time/frequency information of the used resources.

5. An SL DRX configuration of a receiving UE

6. Information related to a receiving UE that is (or will be) operating a timer (e.g., L2 destination ID). Or, information related to a transmitting UE and receiving UE (e.g., a pair of source L2 ID and destination L2 ID).

7. QoS profile information linked to a timer (e.g., PQI). Or, information for a service (e.g., L2 destination ID)

8. A pair of a source L2 ID and a destination L2 ID, for unicast

9. A HARQ process ID and an SL process ID linked to a timer

According to one embodiment of the present disclosure, a new PUCCH format is defined and a method for including MAC CE in the PUCCH format is proposed. For example, in existing PUCCH formats, the information proposed in this disclosure (information for the status of an SL DRX timer) cannot be transmitted, such that even if a UE transmits an SL HARQ NACK, a base station may not be able to allocate retransmission resources among the resources that fall within a DRX active time interval of a receiving UE. For example, if a UE delivers the new PUCCH format proposed in this disclosure (HARQ feedback NACK indication) to a base station, the base station may allocate transmission resources to a transmitting UE that fall within a DRX active time interval of a receiving UE based on the information included in the new PUCCH format.

According to one embodiment of the present disclosure, when a transmitting UE receives SL HARQ NACK feedback for a PSCCH/PSSCH that it has transmitted to a receiving UE, the transmitting UE may deliver the new PUCCH format (NACK indication) proposed in the present disclosure to a base station to enable the base station to allocate transmission resources belonging to the DRX active time of the receiving UE to the transmitting UE.

For example, when a base station receives the MAC CE and/or the new PUCCH format proposed in this disclosure, the base station may recall the previously allocated sidelink transmission resource and allocate a new transmission resource (i.e., a transmission resource that falls within the DRX active time of a receiving UE) to a UE.

The following canceling operations for SR/BSR are also proposed in this disclosure.

According to one embodiment of the present disclosure, a method is proposed wherein when a transmitting UE detects that the sidelink grant allocated by a base station is not included within the DRX active time of a receiving UE, the transmitting UE forwards a PUCCH (ACK indication) to the base station so that the base station no longer allocates transmission resources and also cancels the pending (triggered) SR/BSR for the receiving UE.

For example, even if a transmitting UE requests a retransmission resource by delivering a PUCCH (NACK) to a base station according to the prior art, it may not be possible for the base station to reallocate the transmission resource belonging to the active time of a receiving UE because the base station cannot infer from the PUCCH (NACK) information the DRX active time information of the receiving UE or which resource the UE used to perform the transmission. Therefore, as in the proposed technique, it may be desirable operation for a transmitting UE to report a PUCCH (ACK) to a base station and cancel the pending SR/BSR so that the base station no longer allocates transmission resources (i.e., transmission resources for sidelink data to be transmitted to a receiving UE).

For example, the proposals in this disclosure may be extended/applicable to both SL HARQ enabled MAC PDU transmissions and/or SL HARQ disabled MAC PDU transmissions.

For example, the proposals in this disclosure may be extensible/applicable to both SL dynamic grant and/or SL configured grant-based operations.

The proposals in this disclosure may be extended/applicable to all cases of sidelink unicast, groupcast, and/or broadcast transmission and/or reception.

The timer operations referred to in this disclosure may be solutions that are commonly applicable to all of the following SL DRX timer operations.

SL DRX timer: For example, it may be a timer that causes a UE to operate with an active time during the timer duration. For example, the SL DRX timer may include an SL DRX on-duration timer, an SL DRX inactivity timer, an SL DRX retransmission timer, or an SL DRX active time related timer.

The following Uu DRX timers referenced in this disclosure may be used for the following purposes.

drx-HARQ-RTT-TimerSL timer: For example, a transmitting UE (UE supporting Uu DRX operation) that performs sidelink communication based on sidelink resource allocation mode 1 may represent an interval where a transmitting UE does not perform PDCCH (or, DCI) monitoring for sidelink mode 1 resource allocation from a base station.

drx-RetransmissionTimerSL timer: For example, a transmitting UE (UE supporting Uu DRX operation) performing sidelink communication based on sidelink resource allocation mode 1 may represent an interval where a transmitting UE performs PDCCH (or DCI) monitoring for sidelink mode 1 resource allocation from a base station.

The SL DRX configuration referred to in the present disclosure may include at least one or more of the following parameters.

TABLE 12

●   Sidelink DRX configurations
✓   SL drx-onDurationTimer: the duration at the beginning of a SL DRX Cycle;
✓   SL drx-SlotOffset: the delay before starting the sl drx-onDurationTimer;
✓   SL drx-InactivityTimer: the duration after the PSCCH occasion in which a PSCCH
    indicates a new SL transmission for the MAC entity;
✓   SL drx-RetransmissionTimer (per Sidelink process): the maximum duration until a
    retransmission is received;
✓   SL drx-HARQ-RTT-Timer (per Sidelink process): the minimum duration before
    PSCCH (Sidelink Control Information) & PSSCH for SL HARQ retransmission is
    expected by the MAC entity;
✓   SL drx-LongCycleStartOffset: the Long DRX cycle and drx-StartOffset which
    defines the subframe where the Long and Short DRX Cycle starts;
✓   SL drx-ShortCycle (optional): the Short DRX cycle;
✓   SL drx-ShprtCycleTimer (optional): the duration the UE shall follow the Short
    DRX cycle; SL drx-HARQ-RTT-Timer (per Sidelink process): the minimum
    duration before an assignment for HARQ retransmission is expected by the MAC
    entity.

The SL DRX configuration referred to in this disclosure may include at least one or more of the following parameters.

In addition, in the following descriptions, the names of the timers (SL DRX On-Duration Timer, SL DRX Inactive Timer, SL DRX HARQ RTT Timer, SL DRX Retransmis-

TABLE 13

●   Sidelink DRX configurations
✓   SL drx-onDurationTimer: the duration at the beginning of a SL DRX Cycle;
✓   SL drx-SlotOffset: the delay before starting the sl drx-onDurationTimer;
✓   SL drx-InactivityTimer: the duration after the PSCCH occasion in which a PSCCH
    indicates a new SL transmission for the MAC entity;
✓   SL drx-StartOffset: the subframe where the SL DRX cycle start;
✓   SL drx-Cycle: the SL DRX cycle;
✓   SL drx-HARQ-RTT-Timer (per HARQ process or per sidelink process): the
    minimum duration before an assignment for HARQ retransmission is expected by
    the MAC entity.
✓   SL drx-RetransmissionTimer (per HARQ process or per sidelink process): the
    maximum duration until a retransmission is received The following SL DRX timers mentioned in this disclosure may be used for the following purposes.

SL DRX on-duration timer: Indicates the period of time during which a UE performing SL DRX operation should operate as the default active time to receive PSCCH/PSSCH from other UE.

SL DRX inactivity timer: may represent an interval that extends an SL DRX on-duration interval, which is an interval during which a UE performing SL DRX operation must operate as active time by default to receive PSCCH/PSSCH from other UE. That is, an SL DRX on-duration timer may be extended by the SL DRX inactivity timer interval. Furthermore, when a UE a new packet (new PSSCH transmission) from other UE, the UE may extend the SL DRX on-duration timer by starting an SL DRX inactivity timer.

SL DRX HARQ RTT timer: may indicate an interval during which a UE performing SL DRX operation may operate in sleep mode until it receives a retransmission packet (or PSSCH assignment) from other UE. That is, if a UE starts the SL DRX HARQ RTT timer, the UE may determine that other UE will not transmit a sidelink retransmission packet to it until the SL DRX HARQ RTT timer expires and may operate in sleep mode during that timer.

SL DRX retransmission timer: may indicate an interval of time during which a UE performing SL DRX operation is active time to receive retransmission packets (or PSSCH assignments) transmitted by other UE. For example, when an SL DRX HARQ RTT timer expires, an SL DRX retransmission timer may start. During this timer period, a UE may monitor a reception of retransmission sidelink packets (or PSSCH allocations) transmitted by other UE.

sion Timer, etc.) are exemplary, and based on what is described in each timer, timers that perform the same/similar functions may be considered the same/similar timer regardless of the name.

The proposal in this disclosure is a solution that may also be adapted and extended to address the problem of losses caused by interference during Uu bandwidth part (BWP) switching.

Furthermore, the proposal of this disclosure is a solution that may also be applied and extended to address the problem of loss due to interference caused by SL BWP switching, for example, when a UE supports multiple BWPs of an SL.

The proposals in this disclosure may be extended to parameters (and timers) included in a default/common SL DRX configuration or a default/common SL DRX pattern or a default/common SL DRX configuration, as well as parameters (and, timers) included in a UE pair specific SL DRX configuration or a UE pair specific SL DRX pattern or a UE pair specific SL DRX configuration.

Furthermore, for example, the on-duration term referred to in the proposals of this disclosure may be extended and interpreted to an active time interval, and the off-duration term may be extended and interpreted to a sleep time interval. For example, an active time may represent an interval during which a UE is operating in a wake up state (where RF module is on) to receive/transmit radio signals. For example, sleep time may refer to an interval during which a UE operates in a sleep mode state (where RF module is off) to save power. For example, a sleep time interval does not imply that a transmitting UE is obliged to operate in sleep mode, i.e., the UE may be allowed to operate in active time for a short period of time to perform sensing operations/transmission operations if necessary, even during a sleep time interval.

Furthermore, for example, whether to apply (some of the) proposed schemes/rules of this disclosure and/or the related parameters (e.g., threshold values) may be configured specifically (or differently or independently) according to a resource pool, congestion level, the service priority (and/or type), QoS requirements (e.g., delay, reliability) or PQI, traffic type (e.g., (non) periodic generation), SL transmission resource allocation mode (Mode 1, Mode 2), etc.

For example, whether to apply proposed rules of the present disclosure (and/or related parameter setting values) may be specifically (and/or, independently and/or, differently) for at least one among resource pool, service/packet type (and/or priority), QoS profile or QoS requirements (e.g., URLLC/EMBB traffic, reliability, latency), PQI, PFI, cast type (e.g., unicast, groupcast, broadcast), (resource pool) congestion level (e.g., CBR), SL HARQ feedback scheme (e.g., NACK Only feedback, ACK/NACK feedback), a cast of HARQ feedback enabled MAC PDU (and/or, HARQ feedback disabled MAC PDU) transmission, whether an SL HARQ feedback report operation based on PUCCH is set, a case of (non) performing (or, -based resource reselection) pre-emption (and/or re-evaluation), (L2 or L1) (source and/or destination) identifier, (L2 or L1) (a combination of a source layer ID and a destination layer ID) identifier, (L2 or L1) (a combination of a pair of a source layer ID and a destination layer ID, and cast type) identifier, the direction of a pair of a source layer ID and a destination layer ID, PC5 RRC connection/link, a case of an SL DRX operation, an SL mode type (resource allocation mode 1, resource allocation mode 2), (a) periodic resource reservation performance.

For example, the term specific time as referred to in the proposal of this disclosure may refer to a time when a UE is active for a predefined amount of time to receive SL signal or SL data from the other UE, or a time when the UE operates as active for a time or a specific timer (SL DRX retransmission timer, SL DRX inactivity timer, or a timer that ensures to operate as active in the DRX operation of a receiving UE) time.

Further, for example, the proposals of this disclosure and whether to apply the proposed rules (and/or the related parameter setting values) may also apply to mmWave SL operation.

According to the prior art, when a transmitting UE performs SL communication based on a mode 1 resource allocation method with a receiving UE performing SL DRX operation, since a base station does not know information for a timer operated by the receiving UE, the SL resource to be allocated may not be included within the active time, resulting in difficulties in smooth communication. According to an embodiment of the present disclosure, since the base station is able to know information for the timer related to the SL DRX active time, and the mode 1 SL resource is allocated based on the information, the transmitting UE is able to perform smooth SL communication with the receiving UE performing an SL DRX operation.

FIG. 10 shows a procedure for a first device to perform wireless communication, according to one embodiment of the present disclosure. The embodiment of FIG. 10 may be combined with various embodiments of the present disclosure.

Referring to FIG. 10, in step S1010, a first device may obtain a sidelink (SL) discontinuous reception (DRX) configuration of a second device. In step S1020, the first device may trigger buffer status reporting (BSR). In step S1030, the first device may report the BSR to a base station, based on the BSR being triggered. For example, the BSR may include information for a timer related to an active time of the SL DRX configuration. In step S1040, the first device may receive, from the base station, information related to at least one SL resource allocated based on the information for the timer related to the active time of the SL DRX configuration. In step S1050, the first device may transmit, to the second device, sidelink control information (SCI) for scheduling of a physical sidelink shared channel (PSSCH) through a physical sidelink control channel (PSCCH), based on the at least one SL resource. In step S1060, the first device may transmit, to the second device, SL data through the PSSCH, based on the at least one SL resource.

For example, the time related to the active time may be an SL DRX on-duration timer.

For example, the time related to the active time may be an SL DRX inactivity timer.

For example, the time related to the active time may be an SL DRX retransmission timer.

For example, the time related to the active time may be an SL DRX channel state information (CSI) report timer.

For example, the information for the timer related to the active time may include information for at least one of a length, a starting point, or a length of a remaining time of the timer related to the active time.

For example, the information for the timer related to the active time may include information for at least one of a hybrid automatic repeat request (HARQ) process ID or an SL process ID related to the timer related to the active time.

For example, the information for the timer related to the active time may include information of a unicast link related to the timer related to the active time.

For example, the information for the timer related to the active time may include information for a quality of service (QoS) profile related to the timer related to the active time.

For example, the information for the timer related to the active time may be transmitted based on a triggering of a buffer status reporting (BSR) or a scheduling request (SR).

For example, the information for the timer related to the active time may be periodically transmitted.

For example, the information for the timer related to the active time may be transmitted based on the SL data being new data.

For example, additionally, the first device may transmit, to the second device, an SL DRX command medium access control (MAC) control element (CE). For example, the information for the timer related to the active time may be transmitted based on the transmission of the SL DRX command MAC CE.

The embodiments described above may be applied to various devices described below. First, a processor 102 of a first device 100 may obtain a sidelink (SL) discontinuous reception (DRX) configuration of a second device 200. And, the processor 102 of the first device 100 may trigger buffer status reporting (BSR). And, the processor 102 of the first device 100 may control a transceiver 106 to report the BSR to a base station, based on the BSR being triggered. For example, the BSR may include information for a timer related to an active time of the SL DRX configuration. And, the processor 102 of the first device 100 may control the transceiver 106 to receive, from the base station, information related to at least one SL resource allocated based on the information for the timer related to the active time of the SL DRX configuration. And, the processor 102 of the first device 100 may control the transceiver 106 to transmit, to the second device 200, sidelink control information (SCI) for scheduling of a physical sidelink shared channel (PSSCH) through a physical sidelink control channel (PSCCH), based on the at least one SL resource. And, the processor 102 of the first device 100 may control the transceiver 106 to transmit, to the second device 200, SL data through the PSSCH, based on the at least one SL resource.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: obtain a sidelink (SL) discontinuous reception (DRX) configuration of a second device; trigger buffer status reporting (BSR); report the BSR to a base station, based on the BSR being triggered, wherein the BSR may include information for a timer related to an active time of the SL DRX configuration; receive, from the base station, information related to at least one SL resource allocated based on the information for the timer related to the active time of the SL DRX configuration; transmit, to the second device, sidelink control information (SCI) for scheduling of a physical sidelink shared channel (PSSCH) through a physical sidelink control channel (PSCCH), based on the at least one SL resource; and transmit, to the second device, SL data through the PSSCH, based on the at least one SL resource.

For example, the time related to the active time may be an SL DRX on-duration timer.

For example, the time related to the active time may be an SL DRX inactivity timer.

For example, the time related to the active time may be an SL DRX retransmission timer.

For example, the time related to the active time may be an SL DRX channel state information (CSI) report timer.

For example, the information for the timer related to the active time may include information for at least one of a length, a starting point, or a length of a remaining time of the timer related to the active time.

For example, the information for the timer related to the active time may include information for at least one of a hybrid automatic repeat request (HARQ) process ID or an SL process ID related to the timer related to the active time.

For example, the information for the timer related to the active time may include information of a unicast link related to the timer related to the active time.

For example, the information for the timer related to the active time may include information for a quality of service (QoS) profile related to the timer related to the active time.

For example, the information for the timer related to the active time may be transmitted based on a triggering of a buffer status reporting (BSR) or a scheduling request (SR).

For example, the information for the timer related to the active time may be periodically transmitted.

For example, the information for the timer related to the active time may be transmitted based on the SL data being new data.

For example, additionally, the first device may transmit, to the second device, an SL DRX command medium access control (MAC) control element (CE). For example, the information for the timer related to the active time may be transmitted based on the transmission of the SL DRX command MAC CE.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: obtain a sidelink (SL) discontinuous reception (DRX) configuration of a second UE; trigger buffer status reporting (BSR); report the BSR to a base station, based on the BSR being triggered, wherein the BSR may include information for a timer related to an active time of the SL DRX configuration; receive, from the base station, information related to at least one SL resource allocated based on the information for the timer related to the active time of the SL DRX configuration; transmit, to the second UE, sidelink control information (SCI) for scheduling of a physical sidelink shared channel (PSSCH) through a physical sidelink control channel (PSCCH), based on the at least one SL resource; and transmit, to the second UE, SL data through the PSSCH, based on the at least one SL resource.

According to an embodiment of the present disclosure, a non-transitory computer-readable storage medium storing instructions may be proposed. For example, when executed, the instructions may cause a first device to: obtain a sidelink (SL) discontinuous reception (DRX) configuration of a second device; trigger buffer status reporting (BSR); report the BSR to a base station, based on the BSR being triggered, wherein the BSR may include information for a timer related to an active time of the SL DRX configuration; receive, from the base station, information related to at least one SL resource allocated based on the information for the timer related to the active time of the SL DRX configuration; transmit, to the second device, sidelink control information (SCI) for scheduling of a physical sidelink shared channel (PSSCH) through a physical sidelink control channel (PSCCH), based on the at least one SL resource; and transmit, to the second device, SL data through the PSSCH, based on the at least one SL resource.

Figure 11:
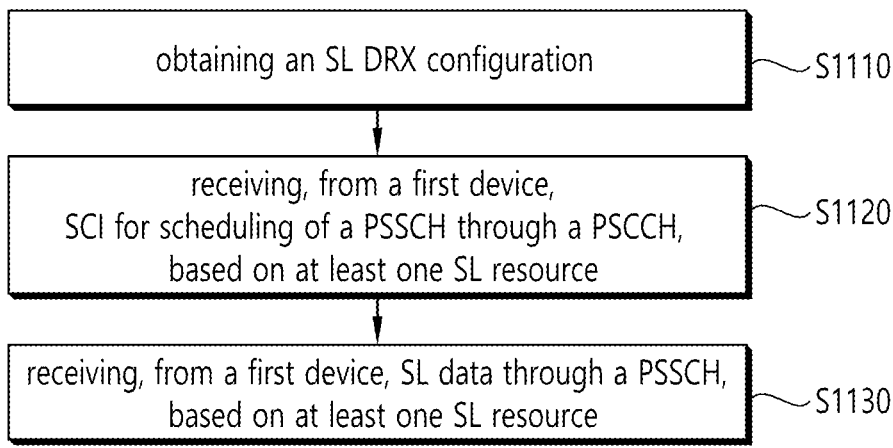
FIG. 11 shows a procedure for a second device to perform wireless communication, according to one embodiment of the present disclosure.

FIG. 11 shows a procedure for a second device to perform wireless communication, according to one embodiment of the present disclosure. The embodiment of FIG. 11 may be combined with various embodiments of the present disclosure.

Referring to FIG. 11, in step S1110, a second device may obtain a sidelink (SL) discontinuous reception (DRX) configuration. In step S1120, the second device may receive, from a first device, sidelink control information (SCI) for scheduling of a physical sidelink shared channel (PSSCH) through a physical sidelink control channel (PSCCH), based on at least one SL resource. In step S1130, the second device may receive, from the first device, SL data through the PSSCH, based on the at least one SL resource, wherein the at least one SL resource may be allocated from a base station based on information for a timer related to an active time of the SL DRX configuration, and wherein the information for the timer related to the active time may be reported to the base station by being included in a buffer status reporting (BSR) based on triggering of the BSR.

For example, the information for the timer related to the active time may include information for at least one of a length, a starting point, or a length of a remaining time of the timer related to the active time.

The embodiments described above may be applied to various devices described below. First, a processor 202 of a second device 200 may obtain a sidelink (SL) discontinuous reception (DRX) configuration. And, the processor 202 of the second device 200 may control a transceiver 206 to receive, from a first device 100, sidelink control information (SCI) for scheduling of a physical sidelink shared channel (PSSCH) through a physical sidelink control channel (PSCCH), based on at least one SL resource. And, the processor 202 of the second device 200 may control the transceiver 206 to receive, from the first device 100, SL data through the PSSCH, based on the at least one SL resource, wherein the at least one SL resource may be allocated from a base station based on information for a timer related to an active time of the SL DRX configuration, and wherein the information for the timer related to the active time may be reported to the base station by being included in a buffer status reporting (BSR) based on triggering of the BSR.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: obtain a sidelink (SL) discontinuous reception (DRX) configuration; receive, from a first device, sidelink control information (SCI) for scheduling of a physical sidelink shared channel (PSSCH) through a physical sidelink control channel (PSCCH), based on at least one SL resource; and receive, from the first device, SL data through the PSSCH, based on the at least one SL resource, wherein the at least one SL resource may be allocated from a base station based on information for a timer related to an active time of the SL DRX configuration, and wherein the information for the timer related to the active time may be reported to the base station by being included in a buffer status reporting (BSR) based on triggering of the BSR.

For example, the information for the timer related to the active time may include information for at least one of a length, a starting point, or a length of a remaining time of the timer related to the active time.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 12:
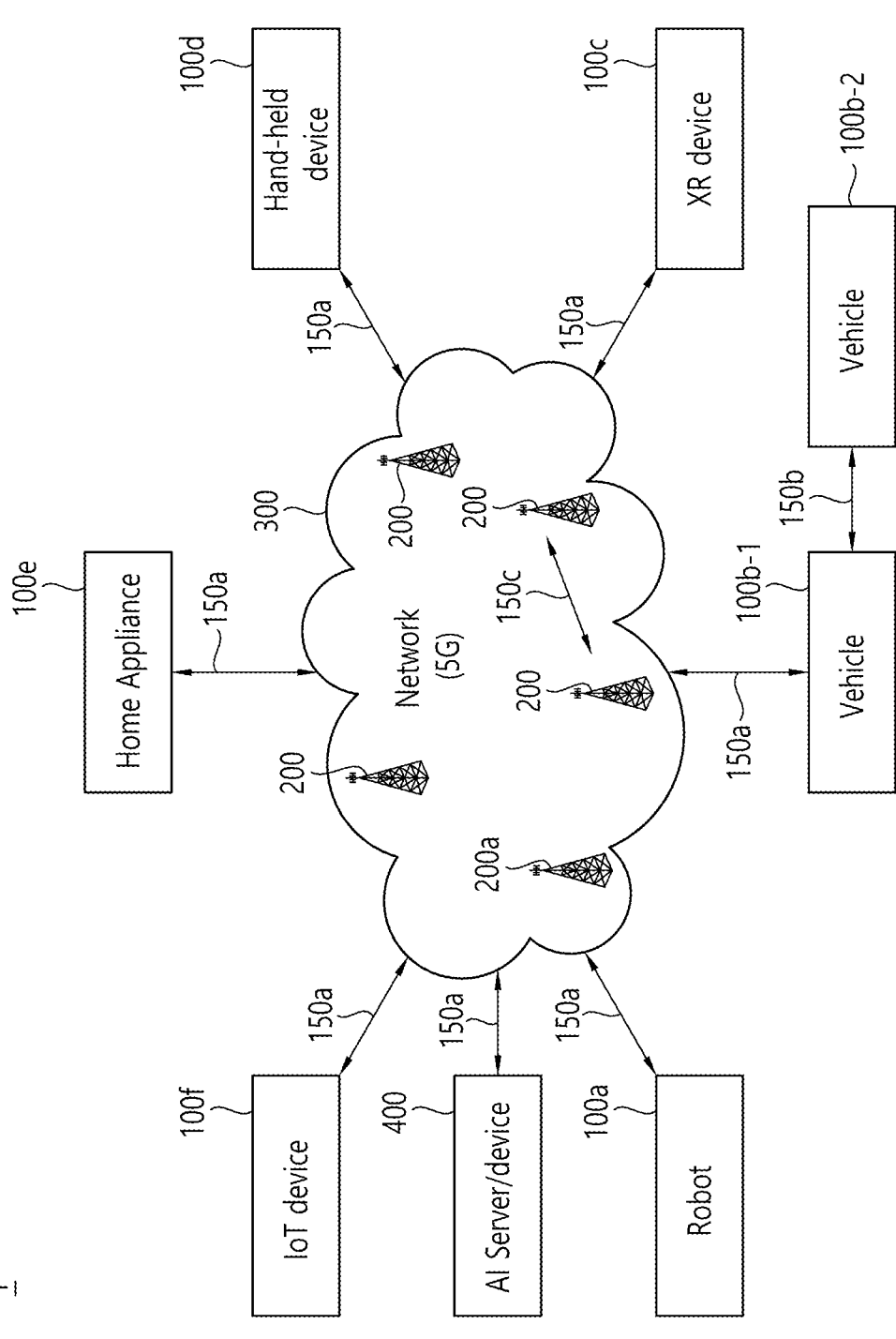
FIG. 12 shows a communication system 1, based on an embodiment of the present disclosure.

FIG. 12 shows a communication system 1, based on an embodiment of the present disclosure. The embodiment of FIG. 12 may be combined with various embodiments of the present disclosure.

Referring to FIG. 12, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server

400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smart-pad, a wearable device (e.g., a smartwatch or a smart-glasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, the wireless communication technologies implemented in the wireless devices 100a-100f of the present disclosure may include LTE, NR, and 6G, as well as Narrowband Internet of Things for low power communication. In this case, for example, NB-IoT technology may be an example of Low Power Wide Area Network (LPWAN) technology, and may be implemented in specifications such as LTE Cat NB1 and/or LTE Cat NB2, and is not limited to the above names. Additionally or alternatively, the wireless communication technology implemented in the wireless devices 100a-100f of this specification may perform communication based on LTE-M technology. In one example, LTE-M technology may be an example of LPWAN technology and may be referred to by various names, such as enhanced Machine Type Communication (eMTC). For example, LTE-M technology may be implemented as at least one of various specifications, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above names. Additionally or alternatively, the wireless communication technology implemented in the wireless devices 100a-100f of this disclosure may include at least one of ZigBee, Bluetooth, and Low Power Wide Area Network (LPWAN), with consideration for low power communication, and is not limited to the above names. For example, ZigBee technology can create personal area networks (PANs) for small, low-power digital communications based on various specifications, such as IEEE 802.15.4, and may be referred to by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 13:
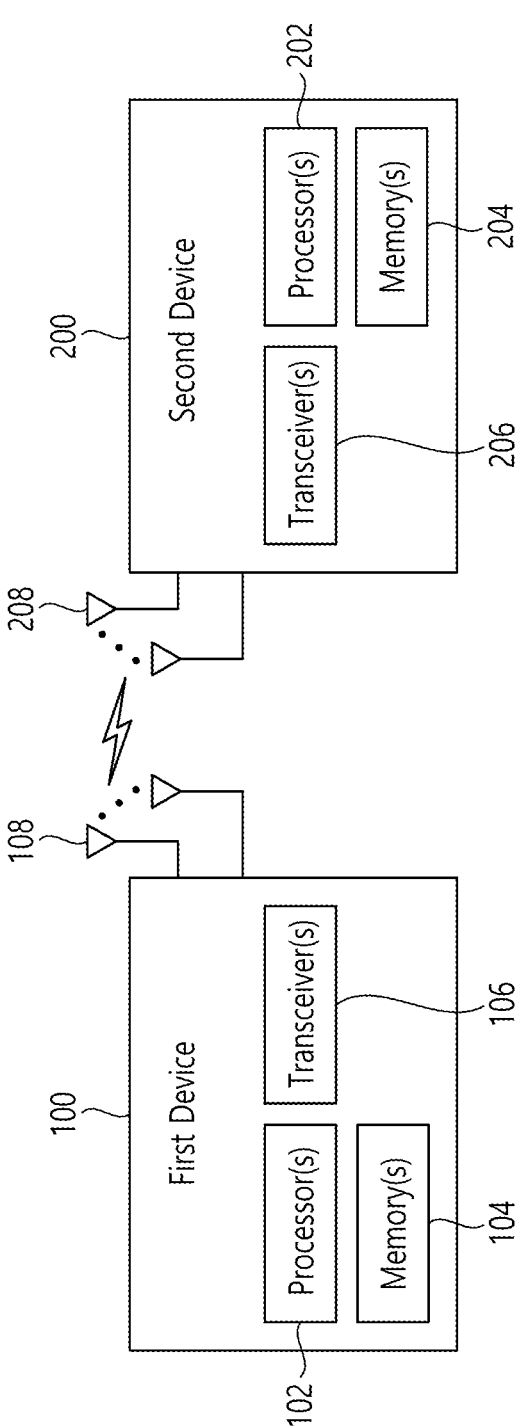
FIG. 13 shows wireless devices, based on an embodiment of the present disclosure.

FIG. 13 shows wireless devices, based on an embodiment of the present disclosure. The embodiment of FIG. 13 may be combined with various embodiments of the present disclosure.

Referring to FIG. 13, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 12.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 14:
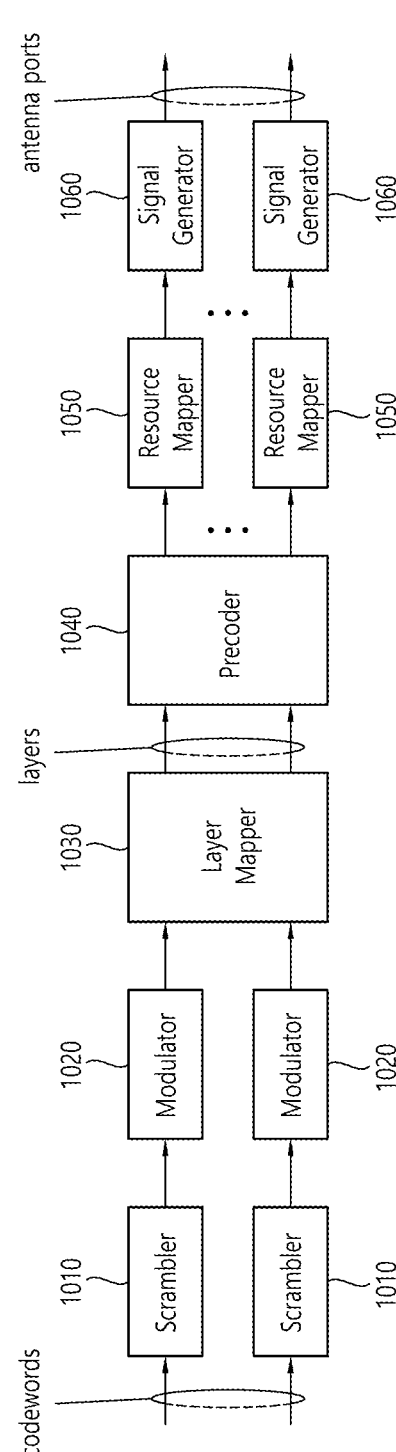
FIG. 14 shows a signal process circuit for a transmission signal, based on an embodiment of the present disclosure.

FIG. 14 shows a signal process circuit for a transmission signal, based on an embodiment of the present disclosure. The embodiment of FIG. 14 may be combined with various embodiments of the present disclosure.

Referring to FIG. 14, a signal processing circuit 1000 may include scramblers 1010, modulators 1020, a layer mapper 1030, a precoder 1040, resource mappers 1050, and signal generators 1060. An operation/function of FIG. 14 may be performed, without being limited to, the processors 102 and 202 and/or the transceivers 106 and 206 of FIG. 13. Hardware elements of FIG. 14 may be implemented by the processors 102 and 202 and/or the transceivers 106 and 206 of FIG. 13. For example, blocks 1010 to 1060 may be implemented by the processors 102 and 202 of FIG. 13. Alternatively, the blocks 1010 to 1050 may be implemented by the processors 102 and 202 of FIG. 13 and the block 1060 may be implemented by the transceivers 106 and 206 of FIG. 13.

Codewords may be converted into radio signals via the signal processing circuit 1000 of FIG. 14. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device.

The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 14. For example, the wireless devices (e.g., 100 and 200 of FIG. 13)

may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 15:
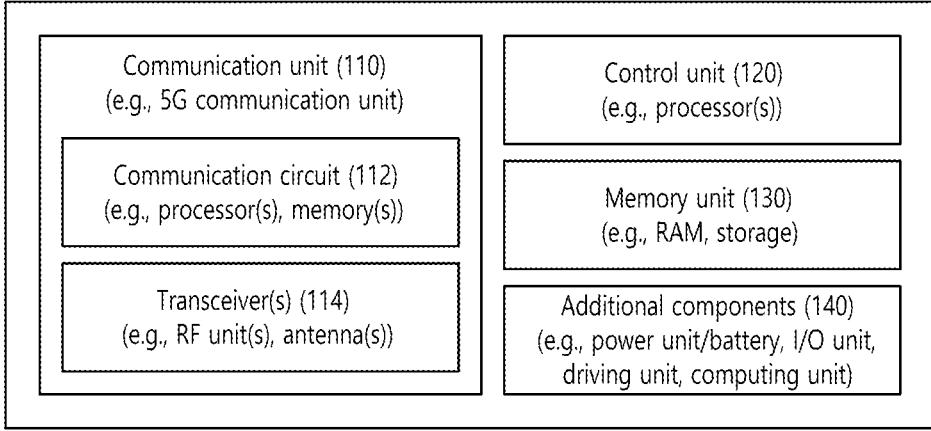
FIG. 15 shows another example of a wireless device, based on an embodiment of the present disclosure.

FIG. 15 shows another example of a wireless device, based on an embodiment of the present disclosure. The wireless device may be implemented in various forms according to a use-case/service (refer to FIG. 12). The embodiment of FIG. 15 may be combined with various embodiments of the present disclosure.

Referring to FIG. 15, wireless devices 100 and 200 may correspond to the wireless devices 100 and 200 of FIG. 13 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 13. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 12), the vehicles (100b-1 and 100b-2 of FIG. 12), the XR device (100c of FIG. 12), the hand-held device (100d of FIG. 12), the home appliance (100e of FIG. 12), the IoT device (100f of FIG. 12), a digital broadcast terminal, a hologram device, a public safety device, an MTC device, a medicine device, a fintech device (or a finance device), a security device, a climate/environment device, the AI server/device (400 of FIG. 12), the BSs (200 of FIG. 12), a network node, etc. The wireless device may be used in a mobile or fixed place according to a use-example/service.

In FIG. 15, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 15 will be described in detail with reference to the drawings.

Figure 16:
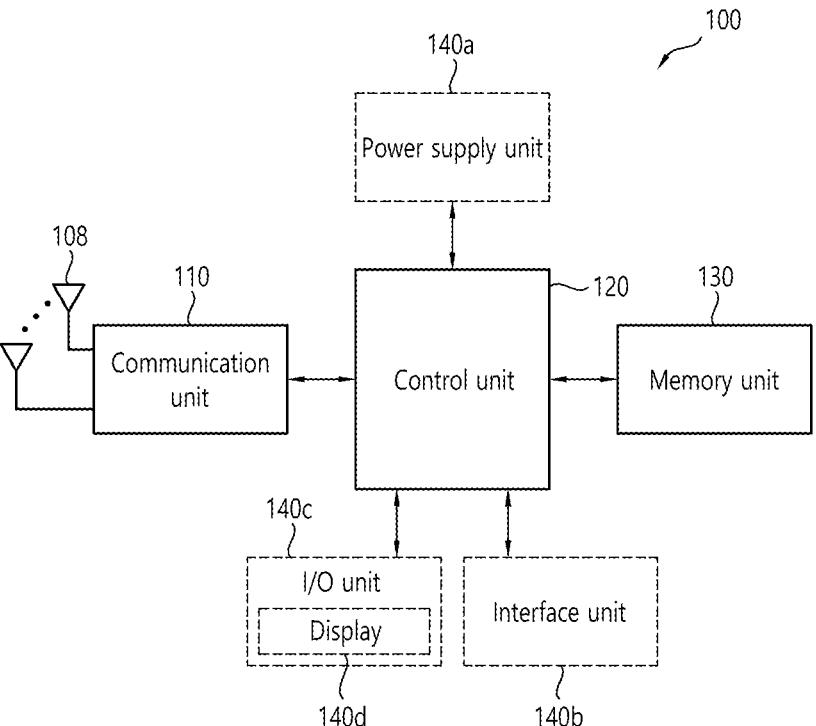
FIG. 16 shows a hand-held device, based on an embodiment of the present disclosure.

FIG. 16 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 16 may be combined with various embodiments of the present disclosure.

Referring to FIG. 16, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 15, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 17:
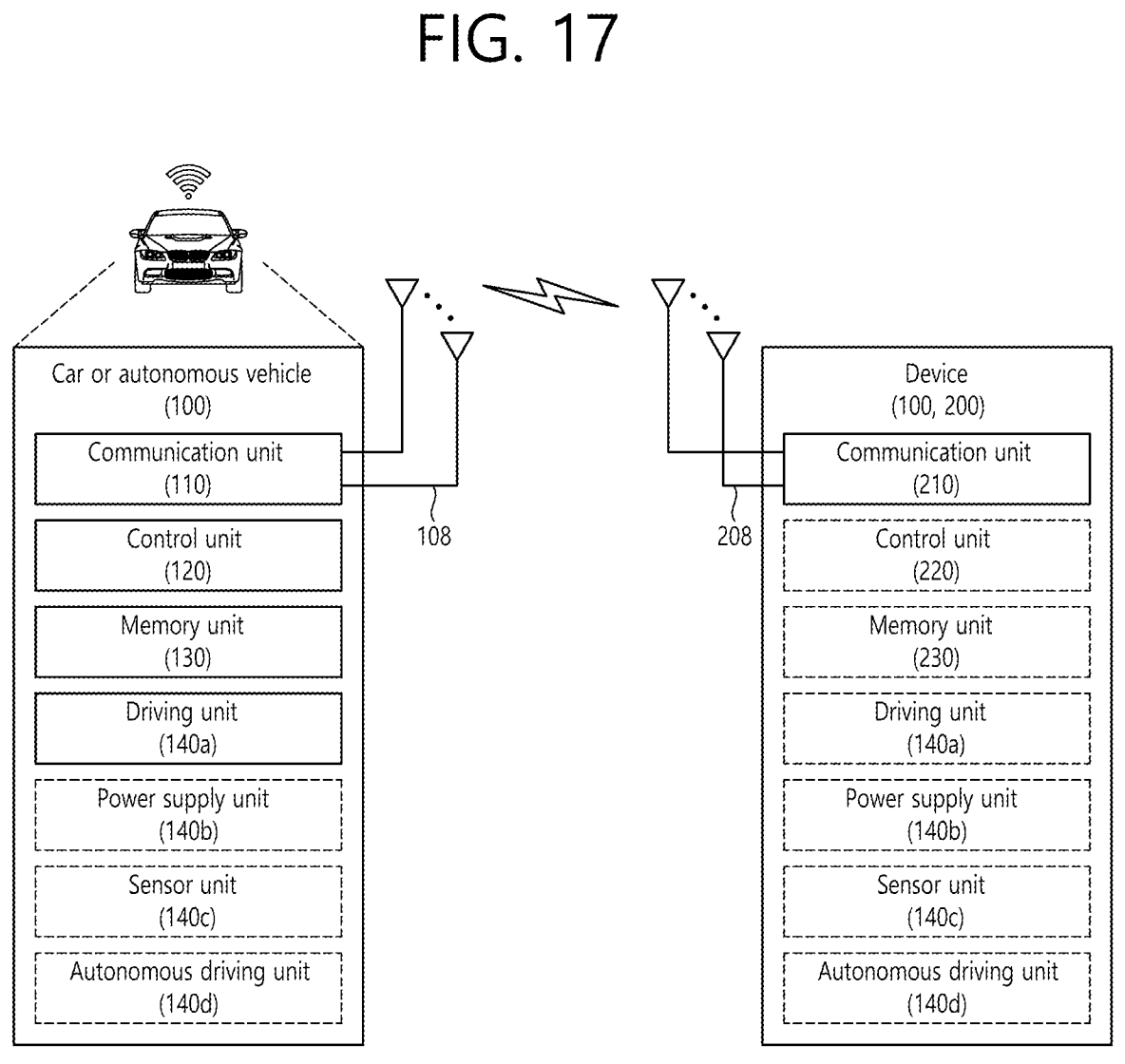

FIG. 17 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 17 may be combined with various embodiments of the present disclosure.

Referring to FIG. 17, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 15, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:
   obtaining a sidelink (SL) discontinuous reception (DRX) configuration of a second device;
   triggering buffer status reporting (BSR);
   reporting the BSR to a base station, based on the BSR being triggered,
   wherein the BSR includes information for a timer related to an active time of the SL DRX configuration;
   receiving, from the base station, information related to at least one SL resource allocated based on the information for the timer related to the active time of the SL DRX configuration;
   transmitting, to the second device, sidelink control information (SCI) for scheduling of a physical sidelink shared channel (PSSCH) through a physical sidelink control channel (PSCCH), based on the at least one SL resource; and
   transmitting, to the second device, SL data through the PSSCH, based on the at least one SL resource.

2. The method of claim 1, wherein the time related to the active time is an SL DRX on-duration timer.

3. The method of claim 1, wherein the time related to the active time is an SL DRX inactivity timer.

4. The method of claim 1, wherein the time related to the active time is an SL DRX retransmission timer.

5. The method of claim 1, wherein the time related to the active time is an SL DRX channel state information (CSI) report timer.

6. The method of claim 1, wherein the information for the timer related to the active time includes information for at least one of a length, a starting point, or a length of a remaining time of the timer related to the active time.

7. The method of claim 1, wherein the information for the timer related to the active time includes information for at least one of a hybrid automatic repeat request (HARQ) process ID or an SL process ID related to the timer related to the active time.

8. The method of claim 1, wherein the information for the timer related to the active time includes information of a unicast link related to the timer related to the active time.

9. The method of claim 1, wherein the information for the timer related to the active time includes information for a quality of service (QoS) profile related to the timer related to the active time.

10. The method of claim 1, wherein the information for the timer related to the active time is transmitted based on a triggering of a buffer status reporting (BSR) or a scheduling request (SR).

11. The method of claim 1, wherein the information for the timer related to the active time is periodically transmitted.

12. The method of claim 1, wherein the information for the timer related to the active time is transmitted based on the SL data being new data.

13. The method of claim 1, further comprising:

transmitting, to the second device, an SL DRX command medium access control (MAC) control element (CE), wherein the information for the timer related to the active time is transmitted based on the transmission of the SL DRX command MAC CE.

14. A first device for performing wireless communication, the first device comprising:

one or more memories storing instructions;

one or more transceivers; and one or more processors connected to the one or more memories and the one or more transceivers, wherein the one or more processors execute the instructions to:

obtain a sidelink (SL) discontinuous reception (DRX) configuration of a second device;

trigger buffer status reporting (BSR);

report the BSR to a base station, based on the BSR being triggered, wherein the BSR includes information for a timer related to an active time of the SL DRX configuration;

receive, from the base station, information related to at least one SL resource allocated based on the information for the timer related to the active time of the SL DRX configuration;

transmit, to the second device, sidelink control information (SCI) for scheduling of a physical sidelink shared channel (PSSCH) through a physical sidelink control channel (PSCCH), based on the at least one SL resource; and transmit, to the second device, SL data through the PSSCH, based on the at least one SL resource.

15. A device adapted to control a first user equipment (UE), the device comprising:

one or more processors; and one or more memories operably connectable to the one or more processors and storing instructions, wherein the one or more processors execute the instructions to:

obtain a sidelink (SL) discontinuous reception (DRX) configuration of a second UE;

trigger buffer status reporting (BSR);

report the BSR to a base station, based on the BSR being triggered, wherein the BSR includes information for a timer related to an active time of the SL DRX configuration;

receive, from the base station, information related to at least one SL resource allocated based on the information for the timer related to the active time of the SL DRX configuration;

transmit, to the second UE, sidelink control information (SCI) for scheduling of a physical sidelink shared channel (PSSCH) through a physical sidelink control channel (PSCCH), based on the at least one SL resource; and transmit, to the second UE, SL data through the PSSCH, based on the at least one SL resource.

* * * * *